US008065073B2

(12) United States Patent
Downs et al.

(10) Patent No.: US 8,065,073 B2
(45) Date of Patent: *Nov. 22, 2011

(54) DYNAMIC TIME SERIES PREDICTION OF FUTURE TRAFFIC CONDITIONS

(75) Inventors: Oliver B. Downs, Redmond, WA (US); Craig H. Chapman, Redmond, WA (US); Alec Barker, Woodinville, WA (US)

(73) Assignee: Inrix, Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/897,621

(22) Filed: Oct. 4, 2010

(65) Prior Publication Data

US 2011/0082636 A1    Apr. 7, 2011

Related U.S. Application Data

(63) Continuation of application No. 11/367,463, filed on Mar. 3, 2006, now Pat. No. 7,813,870.

(51) Int. Cl.
*G06F 19/00* (2011.01)
*G06G 7/70* (2006.01)
*G06G 7/76* (2006.01)
*G06G 1/00* (2006.01)

(52) U.S. Cl. .............. 701/117; 701/119; 340/995.13

(58) Field of Classification Search ............ 701/117, 701/119; 340/995.13
See application file for complete search history.

(56) References Cited

U.S. PATENT DOCUMENTS

| 3,582,620 A | 6/1971 | Noetinger ............ 235/150.24 |
| 3,626,413 A | 12/1971 | Zachmann ................ 343/8 |
| 4,866,438 A | 9/1989 | Knisch .................. 340/936 |
| 4,985,705 A | 1/1991 | Stammler ................. 342/69 |
| 5,289,183 A | 2/1994 | Hassett et al. ........... 340/905 |
| 5,337,082 A | 8/1994 | Fredericks .............. 342/69 |
| 5,465,289 A | 11/1995 | Kennedy, Jr. ............ 379/59 |
| 5,610,821 A | 3/1997 | Gazis et al. ............ 364/444.2 |

(Continued)

FOREIGN PATENT DOCUMENTS

DE    100 63 763    7/2002

(Continued)

OTHER PUBLICATIONS

"Dash Express Automotive Navigation System," retrieved Aug. 3, 2007, from http://www.dash.net/product.php, 1 page.

(Continued)

*Primary Examiner* — Dalena Tran
*Assistant Examiner* — Jamie Figueroa
(74) *Attorney, Agent, or Firm* — Seed IP Law Group PLLC

(57) ABSTRACT

Techniques are described for generating predictions of future traffic conditions at multiple future times, such as by using probabilistic techniques to assess various input data while repeatedly producing future time series predictions for each of numerous road segments (e.g., in a real-time manner based on changing current conditions for a network of roads in a given geographic area). In some situations, one or more predictive Bayesian models and corresponding decision trees are automatically created for use in generating the future traffic condition predictions for each geographic area of interest, such as based on observed historical traffic conditions for those geographic areas. Predicted future traffic condition information may then be used in a variety of ways to assist in travel and for other purposes, such as to plan optimal routes through a network of roads based on predictions about traffic conditions for the roads at multiple future times.

55 Claims, 25 Drawing Sheets

U.S. PATENT DOCUMENTS

| | | | |
|---|---|---|---|
| 5,663,720 A | 9/1997 | Weissman | 340/934 |
| 5,696,502 A | 12/1997 | Busch et al. | 340/905 |
| 5,745,865 A | 4/1998 | Rostoker et al. | 701/117 |
| 5,827,712 A | 10/1998 | Yokoyama et al. | 435/193 |
| 6,011,515 A | 1/2000 | Radcliffe et al. | 342/453 |
| 6,119,013 A | 9/2000 | Maloney et al. | 455/456 |
| 6,150,961 A | 11/2000 | Alewine et al. | 340/995 |
| 6,292,742 B1 | 9/2001 | Heimann et al. | 707/117 |
| 6,401,027 B1 | 6/2002 | Xu et al. | 701/117 |
| 6,463,382 B1 | 10/2002 | Bullock | 701/117 |
| 6,480,783 B1 | 11/2002 | Myr | 701/117 |
| 6,490,519 B1 | 12/2002 | Lapidot et al. | 701/117 |
| 6,496,773 B1 | 12/2002 | Olsson | 701/117 |
| 6,505,114 B2 | 1/2003 | Luciani | 701/117 |
| 6,574,548 B2 | 6/2003 | DeKock et al. | 701/117 |
| 6,594,576 B2 | 7/2003 | Fan et al. | 701/117 |
| 6,650,948 B1 | 11/2003 | Atkinson et al. | 700/66 |
| 6,664,922 B1 | 12/2003 | Fan | 342/357.1 |
| 6,728,628 B2 | 4/2004 | Peterson | 701/117 |
| 6,781,523 B2 | 8/2004 | Matsui et al. | 340/910 |
| 6,832,140 B2 | 12/2004 | Fan et al. | 701/33 |
| 6,862,524 B1 | 3/2005 | Nagda et al. | 701/209 |
| 6,882,313 B1 | 4/2005 | Fan et al. | 342/457 |
| 6,922,566 B2 | 7/2005 | Puranik et al. | 455/456.2 |
| 6,973,319 B2 | 12/2005 | Ormson | 455/456.1 |
| 6,989,765 B2 | 1/2006 | Gueziec | 340/905 |
| 7,026,958 B2 | 4/2006 | Wainfan et al. | 340/995.13 |
| 7,027,915 B2 | 4/2006 | Craine | 701/117 |
| 7,069,143 B2 | 6/2006 | Peterson | 701/117 |
| 7,096,115 B1 | 8/2006 | Groth et al. | 701/117 |
| 7,116,326 B2 | 10/2006 | Soulchin et al. | 345/440 |
| 7,161,497 B2 | 1/2007 | Gueziec | 340/905 |
| 7,221,287 B2 | 5/2007 | Gueziec et al. | 340/905 |
| 7,375,649 B2 | 5/2008 | Gueziec | 340/905 |
| 7,508,321 B2 | 3/2009 | Gueziec et al. | 340/905 |
| 7,519,564 B2 | 4/2009 | Horvitz | 706/12 |
| 7,557,730 B2 | 7/2009 | Gueziec | 340/905 |
| 7,610,145 B2 | 10/2009 | Kantarjiev et al. | 701/204 |
| 7,813,870 B2 * | 10/2010 | Downs et al. | 701/117 |
| 2002/0051464 A1 | 5/2002 | Sin et al. | 370/466 |
| 2003/0069683 A1 | 4/2003 | Lapidot et al. | 701/117 |
| 2004/0249568 A1 | 12/2004 | Endo et al. | 701/209 |
| 2006/0074551 A1 | 4/2006 | Zaitsu et al. | 701/209 |
| 2006/0103674 A1 | 5/2006 | Horvitz et al. | 345/629 |
| 2006/0106530 A1 | 5/2006 | Horvitz et al. | 701/117 |
| 2006/0106599 A1 | 5/2006 | Horvitz | 704/219 |
| 2006/0122846 A1 | 6/2006 | Burr et al. | 705/1 |
| 2006/0149461 A1 | 7/2006 | Rowley et al. | 701/202 |
| 2006/0155464 A1 | 7/2006 | Smartt | 701/208 |
| 2006/0224797 A1 | 10/2006 | Parish et al. | 710/62 |
| 2006/0229802 A1 | 10/2006 | Vertelney et al. | 701/200 |
| 2007/0005419 A1 | 1/2007 | Horvitz et al. | 705/14 |
| 2007/0073477 A1 | 3/2007 | Krumm et al. | 701/209 |
| 2007/0199050 A1 | 8/2007 | Meier | 726/4 |
| 2007/0208492 A1 | 9/2007 | Downs et al. | 701/117 |
| 2007/0208494 A1 | 9/2007 | Chapman et al. | 701/117 |
| 2007/0208495 A1 | 9/2007 | Chapman et al. | 701/117 |
| 2007/0208496 A1 | 9/2007 | Downs et al. | 701/117 |
| 2007/0208497 A1 | 9/2007 | Downs et al. | 701/117 |
| 2007/0208498 A1 | 9/2007 | Barker et al. | 701/117 |
| 2007/0208501 A1 | 9/2007 | Downs et al. | 701/119 |
| 2008/0021791 A1 | 1/2008 | Steelberg et al. | 705/26 |
| 2008/0046165 A1 | 2/2008 | Downs et al. | 701/117 |
| 2008/0059115 A1 | 3/2008 | Wilkinson | 702/179 |
| 2008/0071465 A1 | 3/2008 | Chapman et al. | 701/117 |
| 2008/0071466 A1 | 3/2008 | Downs et al. | 701/117 |
| 2008/0133517 A1 | 6/2008 | Kapoor et al. | 707/6 |
| 2008/0275309 A1 | 11/2008 | Stivoric et al. | 600/300 |
| 2008/0278328 A1 | 11/2008 | Chand et al. | 340/572.1 |
| 2009/0118996 A1 | 5/2009 | Kantarjiev et al. | 701/119 |

FOREIGN PATENT DOCUMENTS

| | | |
|---|---|---|
| DE | 102004 015880 | 11/2004 |
| DE | 103 36 590 | 2/2005 |
| JP | 2006-90872 | 4/2006 |
| WO | 2004/021305 | 3/2004 |
| WO | 2004/021306 | 3/2004 |
| WO | 2006/005906 | 1/2006 |

OTHER PUBLICATIONS

"Dash Navigation Unveils First Internet-Connected Auto Navigation Device," Sep. 26, 2006, Dash Navigation™, Inc., retrieved Aug. 3, 2007, from http://www.dash.net/news_pr-060925.php, 1 page.

"Inrix Advances Navigation with 'Nationwide Average Speeds'," Aug. 7, 2006, Inrix, Inc., retrieved Jul. 19, 2007, from http://www.inrix.com/news_NationwideAverageSpeeds_07Aug2006.asp, 1 page.

"Inrix Historical Traffic Improves Consumer Navigation Experience," Jul. 18, 2007, Inrix, Inc., retrieved Jul. 19, 2007, from http://www.inrix.com/news_NAS_18July2007.asp, 2 pages.

"LandSonar, Inc. Announces First-Ever Nationwide Traffic-Prediction Product," Jan. 22, 2006, LandSonar, Inc., retrieved Jul. 20, 2007, from http://www.landsonar.com/?p=55, 3 pages.

"NAVTEQ Launches NAVTEQ Traffic Patterns™ Database: *Historic Traffic Data is the Basis for Predicting Traffic Behavior and Enhancing Routes*," Jan. 5, 2007, NAVTEQ, retrieved Jul. 19, 2007, from http://www.navteq.com/webapps/NewsUserServlet?action=NewsDetail&newsId=479, 2 pages.

"TrafficCast International and LandSonar Introduce LPS Plus," Mar. 1, 2007, LandSonar, Inc., retrieved Jul. 19, 2007, from http://www.landsonar.com/?p=117, 2 pages.

"About LandSonar, Inc.," retrieved Apr. 27, 2006, from http://www.landsonar.com/?page_id=2, 2 pages.

"Award Abstract—#0349460—SBIR Phase II: Animated Real-Time Road Traffic Visualization for Broadcast and the Internet," National Science Foundation, retrieved Jul. 31, 2006, from http://www.nsf.gov/awardsearch/showAward.do?AwardNumber=0349460, 2 pages.

"Global Positioning Systems > Tracking Systems in the Yahoo! Directory," Yahoo!® Small Business Directory, retrieved Feb. 8, 2006, from http://dir.yahoo.com/Business_and_Economy/Business_to_Business/Navigation/Global_Positioning_Systems/Tracking_Systems, 8 pages.

"Powerful Tool Crunches Commutes," Mar. 8, 2005, National Science Foundation, retrieved Jan. 20, 2006, from http://www.beatthetraffic.com/aboutus/nsf20050308.htm, 2 pages.

"Seattle Area Traffic—Central Puget Sound Travel Times," Washington State Department of Transportation, retrieved Jan. 20, 2006, from http://www.wsdot.wa.gov/traffic/seattle/traveltimes/, 3 pages.

"Technology Overview," retrieved Apr. 27, 2006, from http://www.landsonar.com/?page_id=20, 3 pages.

BeatTheTraffic.com: The Right Traffic at the Right Time™, Homepage, retrieved Jan. 20, 2006, from http://www.beatthetraffic.com/, 1 page.

Graham-Rowe, D., "Smart Traffic Forecast Offers Seven-Day Predictions," Jun. 29, 2005, NewScientist.com, retrieved Jan. 20, 2006, from http://www.newscientist.com/article.ns?id=dn7605&print=true, 2 pages.

Green, D., "Navigating by Phone," Apr. 28, 2004, Palo Alto Weekly Online Edition, retrieved Jul. 27, 2006, from http://www.paloaltoonline.com/weekly/morgue/2004/2004_04_28.zipdash28ja.shtml, 3 pages.

Slawski, W., "Ending Gridlock with Google Driving Assistance (Zipdash Re-Emerges)," Jul. 6, 2006, retrieved Jul. 27, 2006, from http://www.seobythesea.com/?p=240, 3 pages.

Smith, B. "OmniTRACS Keeps on Trucking," Dec. 1, 2005, WirelessWeek.com, retrieved Feb. 7, 2006, from http://www.wirelessweek.com/index.asp?layout=articlePrint&articleID=CA6287997, 2 pages.

Utter, D., "Google Mobilizes Traffic Data," Jul. 25, 2006, webpronews.com, retrieved Jul. 27, 2006, from http://www.webpronews.com/topnews/topnews/wpn-60-20060725GoogleMobilizesTrafficData.html, 3 pages.

\* cited by examiner

210

| Variable | Possible Values |
|---|---|
| 214a IsSchoolDay | true, false |
| 214b Precipitation | none, low, medium, high |
| 214c StadiumXEvtType | none, football, concert, soccer, other |
| 214d PercentBlackSegmentX-Y | [0, 1.0] |
| 214e BlackStartSegmentX | notblack, 0, 5, 10, 15, ..., 30 |
| 214f SegmentXColorY | green, yellow, red, black |
| 214g ... | ... |

Input Variables / Output Variables

| | IsSchool Day | Precip- itation | StadiumX EvtType | PercentBlack SegmentX-Y | ... | BlackStart SegmentN | Segment1 Color15 | Segment1 Color30 | ... | SegmentN Color180 |
|---|---|---|---|---|---|---|---|---|---|---|
| 222a | | 222b | 222c | 222d | | 222e | 222f | 222g | 222h | 222i 222j |
| 224a | true | none | soccer | 0.22 | | 0 | red | black | | yellow |
| 224b | true | none | football | 0.05 | | notblack | green | red | | green |
| 224c | false | low | none | 0.13 | | 15 | green | black | | black |
| 224d | false | medium | concert | 0.07 | | 10 | yellow | yellow | | red |
| 224e | false | high | other | 0.11 | | 5 | green | green | | yellow |
| 224f | | | | | | | | | | |
| 224g | true | none | none | 0.16 | | notblack | green | green | | black |

*Fig. 2C*

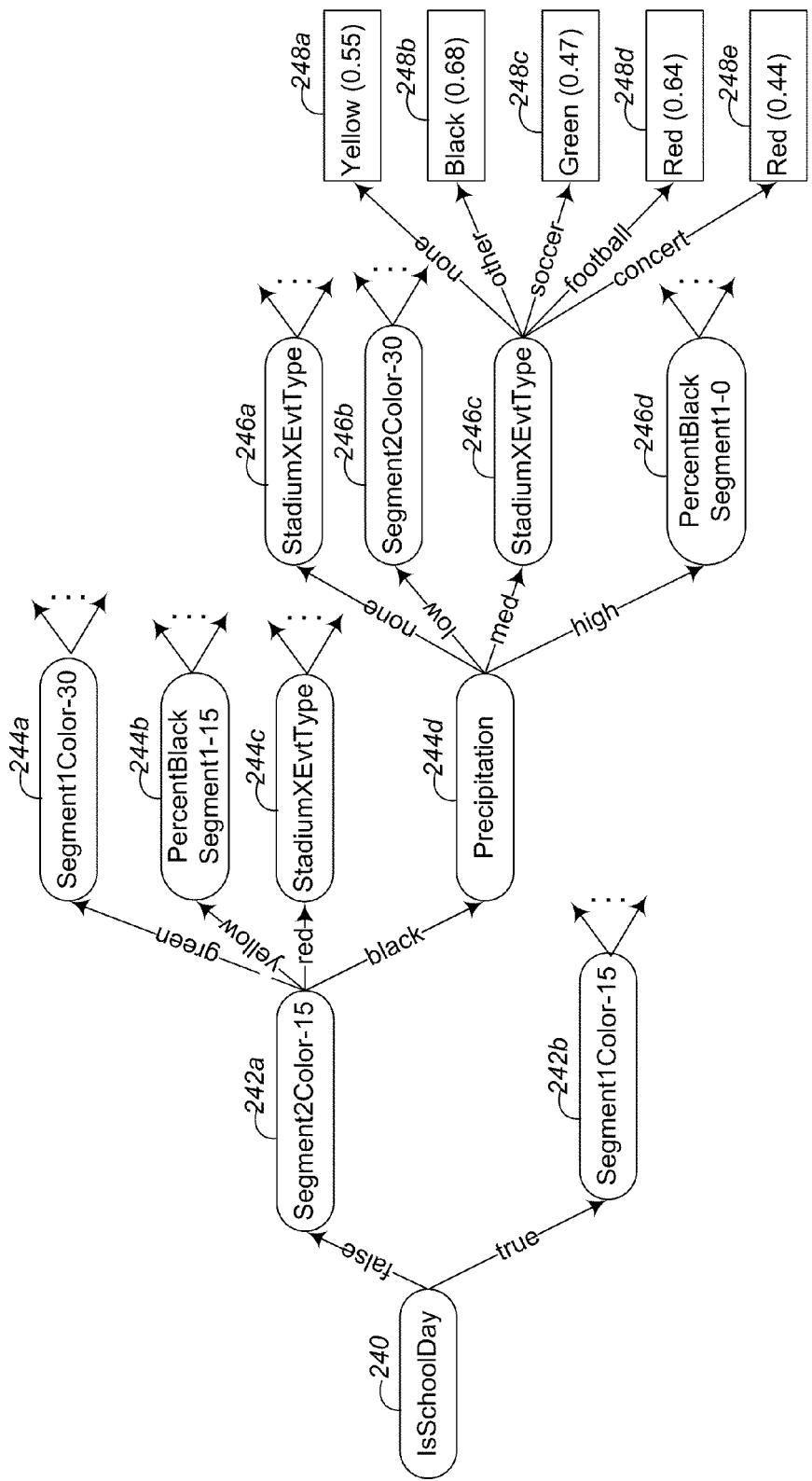

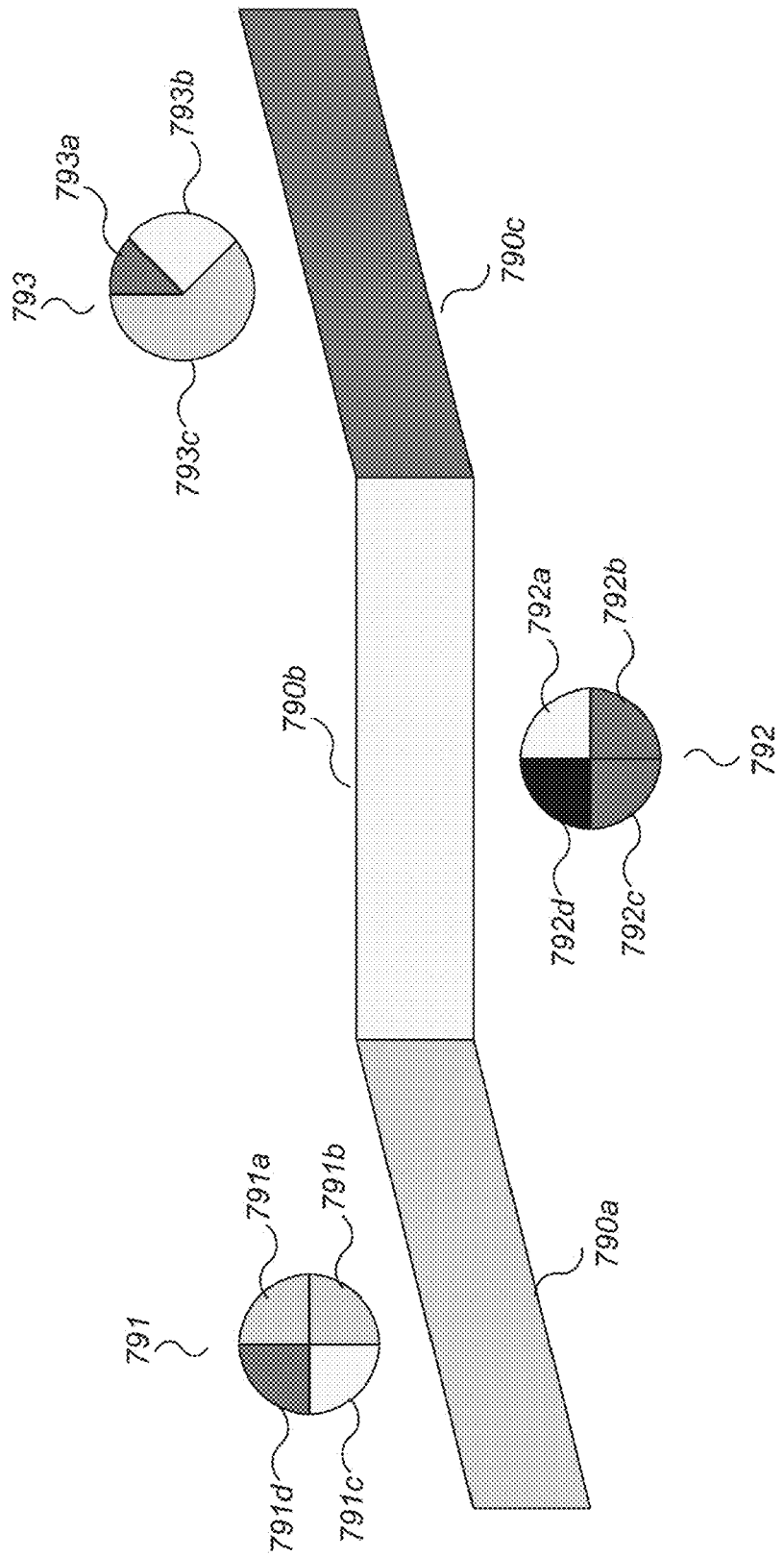

DYNAMIC TIME SERIES PREDICTION OF FUTURE TRAFFIC CONDITIONS

CROSS-REFERENCE TO RELATED APPLICATIONS

This application is a continuation of U.S. application Ser. No. 11/367,463, filed Mar. 3, 2006 and entitled "Dynamic Time Series Prediction of Future Traffic Conditions," which is hereby incorporated by reference in its entirety.

TECHNICAL FIELD

The following disclosure relates generally to techniques for predicting future traffic conditions, such as in a probabilistic manner based on current and expected future conditions so as to improve travel over roads in one or more geographic areas.

BACKGROUND

As road traffic has continued to increase at rates greater than increases in road capacity, the effects of increasing traffic congestion have had growing deleterious effects on business and government operations and on personal well-being. Accordingly, efforts have been made to combat the increasing traffic congestion in various ways, such as by obtaining and providing information about current traffic conditions to individuals and organizations. One source for obtaining information about current traffic conditions in some larger metropolitan areas is networks of traffic sensors capable of measuring traffic flow for various roads in the area (e.g., via sensors embedded in the road pavement), and such current traffic condition information may be provided to interested parties in various ways (e.g., via frequent radio broadcasts, an Internet Web site that displays a map of a geographical area with color-coded information about current traffic congestion on some major roads in the geographical area, information sent to cellular telephones and other portable consumer devices, etc.). However, while such current traffic information provides some benefits in particular situations, the lack of accurate information about future traffic conditions creates a number of problems.

Accordingly, limited attempts have been made to generate and provide information about possible future traffic conditions, but such attempts have typically suffered from inaccuracies in the generated information, as well as various other problems. For example, some efforts to provide information about possible future traffic conditions have merely calculated and provided historical averages of accumulated data. While such historical averages may occasionally produce information for a particular place at a particular day and time that is temporarily similar to actual conditions, such historical averages cannot adapt to reflect specific current conditions that can greatly affect traffic (e.g., weather problems, traffic accidents, current road work, non-periodic events with large attendance, etc.), nor can they typically accommodate general changes over time in the amount of traffic, and thus the generated information is typically inaccurate and of little practical use for planning purposes.

Other prior efforts to provide information about possible future traffic conditions have utilized statistical methods to incorporate some current traffic and other condition information with historical traffic flow data to make a static projection related to a single possible future change in traffic flow. For example, for a particular road interval, such prior efforts may make an attempt to generate a single static projection of how long it will be until the amount of traffic flow on the road interval might change (e.g., to change from flowing poorly to flowing freely). However, even if such efforts to project an amount of time until traffic flow changes were able to provide accurate projections, such limited future information does not typically produce sufficient information in sufficient detail to allow detailed planning. For example, such systems cannot project future traffic conditions over each of multiple future time intervals for multiple roads in a road network, such as to allow an optimal path to accurately be identified through various roads in the network based on the projected information.

Thus, it would be beneficial to provide improved techniques for predicting future traffic conditions for multiple road segments at each of multiple future time intervals, such as based on past, current, and expected future traffic and other conditions, as well as to provide additional related capabilities.

BRIEF DESCRIPTION OF THE DRAWINGS

FIGS. 2A-2J illustrate various graphical representations of predictive models for representing knowledge about traffic conditions in a given geographic area.

FIGS. 7A-7I illustrate example displays of various traffic-related information using predictions of future traffic conditions.

DETAILED DESCRIPTION

Figure 1A:
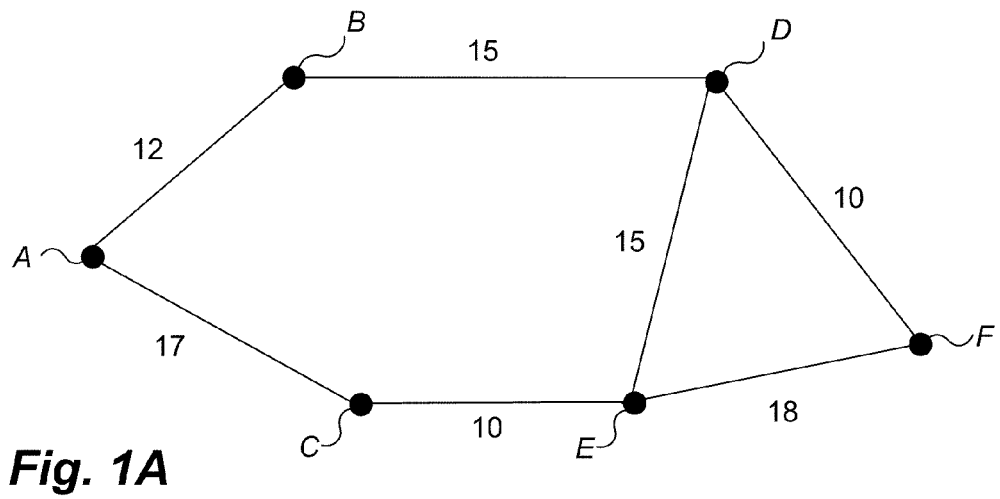
FIGS. 1A-1F illustrate examples of travel route selection based on predicted future traffic conditions.

Techniques are described for generating predictions of future traffic conditions at multiple future times. In some embodiments, the predictions are generated using probabilistic techniques that incorporate various types of input data in order to repeatedly produce future time series predictions for each of numerous road segments, such as in a real-time manner based on changing current conditions for a network of roads in a given geographic area. Moreover, in at least some embodiments one or more predictive Bayesian or other models are automatically created for use in generating the future traffic condition predictions for each geographic area of interest, such as based on observed historical traffic conditions for those geographic areas. Predicted future traffic condition information may be used in a variety of ways to assist in travel and for other purposes, such as to plan optimal routes through a network of roads based on predictions about traffic conditions for the roads at multiple future times. In at least some embodiments, a predictive traffic information provider system uses the described techniques to generate such predictions, as described in greater detail below.

In some embodiments, the types of input data used to generate predictions of future traffic conditions may include a variety of current, past, and expected future conditions, and outputs from the prediction process include the generated predictions of the expected traffic conditions on each of multiple target road segments of interest for each of multiple future times (e.g., every 5, 15 or 60 minutes in the future) within a pre-determined time interval (e.g., three hours, or one day), as discussed in greater detail below. For example, types of input data may include the following: information about current and past amounts of traffic for various target road segments of interest in a geographic area, such as for a network of selected roads in the geographic area; information about current and recent traffic accidents; information about current, recent and future road work; information about current, past and expected future weather conditions (e.g., precipitation, temperature, wind direction, wind speed, etc.); information about at least some current, past and future scheduled events (e.g., type of event, expected start and end times of the event, and/or a venue or other location of the event, etc., such as for all events, events of indicated types, events that are sufficiently large, such as to have expected attendance above an indicated threshold (for example, 1000 or 5000 expected attendees), etc.); and information about school schedules (e.g., whether school is in session and/or the location of one or more schools). Moreover, current and predicted future traffic conditions may be measured and represented in one or more of a variety of ways, such as in absolute terms (e.g., average vehicle speed, volume of traffic for an indicated period of time; average occupancy time of one or more traffic sensors, such as to indicate the average percentage of time that a vehicle is over or otherwise activating the sensor; one of multiple enumerated levels of roadway congestion, such as measured based on one or more other traffic condition measures; etc.) and/or in relative terms (e.g., to represent a difference from typical or from maximum). In addition, while in some embodiments the multiple future times at which future traffic conditions are predicted are each points in time, in other embodiments such predictions may instead represent multiple time points (e.g., a period of time), such as by representing an average or other aggregate measure of the future traffic conditions during those multiple time points. Furthermore, some or all of the input data may be known and represented with varying degrees of certainty (e.g., expected weather), and additional information may be generated to represent degrees of confidence in and/or other metadata for the generated predictions. In addition, the prediction of future traffic conditions may be initiated for various reasons and at various times, such as in a periodic manner (e.g., every five minutes), when any or sufficient new input data is received, in response to a request from a user, etc.

Some of the same types of input data may be used to similarly generate longer-term forecasts of future traffic conditions (e.g., one week in the future, or one month in the future) in some embodiments, but such longer-term forecasts may not use some of the types of input data, such as information about current conditions at the time of the forecast generation (e.g., current traffic, weather, or other conditions). In addition, such longer-term forecasts may be generated less frequently than shorter-term predictions, and may be made so as to reflect different future time periods than for shorter-term predictions (e.g., for every hour rather than every 15 minutes).

The roads and/or road segments for which future traffic condition predictions and/or forecasts are generated may also be selected in various manners in various embodiments. In some embodiments, future traffic condition predictions and/or forecasts are generated for each of multiple geographic areas (e.g., metropolitan areas), with each geographic area having a network of multiple inter-connected roads—such geographic areas may be selected in various ways, such as based on areas in which current traffic condition information is readily available (e.g., based on networks of road sensors for at least some of the roads in the area) and/or in which traffic congestion is a significant problem. In some such embodiments, the roads for which future traffic condition predictions and/or forecasts are generated include those roads for which current traffic condition information is readily available, while in other embodiments the selection of such roads may be based at least in part on one or more other factors (e.g., based on size or capacity of the roads, such as to include freeways and major highways; based on the role the roads play in carrying traffic, such as to include arterial roads and collector roads that are primary alternatives to larger capacity roads such as freeways and major highways; based on functional class of the roads, such as is designated by the Federal Highway Administration; etc.). In other embodiments, future traffic condition predictions and/or forecasts may be made for a single road, regardless of its size and/or inter-relationship with other roads. In addition, segments of roads for which future traffic condition predictions and/or forecasts are generated may be selected in various manners, such as to treat each road sensor as a distinct segment; to group multiple road sensors together for each road segment (e.g., to reduce the number of independent predictions and/or forecasts that are made, such as by grouping specified numbers of road sensors together); to select road segments so as to reflect logically related sections of a road in which traffic conditions are typically the same or sufficiently similar (e.g., strongly correlated), such as based on traffic condition information from traffic sensors and/or from other sources (e.g., data generated from vehicles and/or users that are traveling on the roads, as discussed in greater detail below); etc.

In addition, future traffic condition prediction and/or forecast information may be used in a variety of ways in various embodiments, as discussed in greater detail below, including to provide such information to users and/or organizations at various times (e.g., in response to requests, by periodically sending the information, etc.) and in various ways (e.g., by transmitting the information to cellular telephones and/or other portable consumer devices; by displaying information to users, such as via Web browsers and/or application programs; by providing the information to other organizations and/or entities that provide at least some of the information to users, such as third parties that perform the information providing after analyzing and/or modifying the information; etc.). For example, in some embodiments, the prediction and/or forecast information is used to determine suggested travel routes and/or times, such as an optimal route between a starting location and an ending location over a network of roads and/or an optimal time to perform indicated travel, with such determinations based on predicted and/or forecast information at each of multiple future times for one or more roads and/or road segments.

For illustrative purposes, some embodiments are described below in which specific types of predictions are generated in specific ways using specific types of input, and in which generated prediction information is used in various specific ways. However, it will be understood that such future traffic predictions may be generated in other manners and using other types of input data in other embodiments, that the described techniques can be used in a wide variety of other situations, that future traffic forecasts may similarly be generated and used in various ways, and that the invention is thus not limited to the exemplary details provided.

FIGS. 1A-1F illustrate examples of performing travel route selection based on predicted future traffic conditions. In particular, FIG. 1A illustrates multiple potential travel routes between a starting point A and a destination point F in the form of an undirected graph, with intermediate nodes labeled B-E—for example, listing nodes in order along a route, one potential route is ABDF, while other potential routes are ABDEF, ACEF and ACEDF. In addition, the edges between the nodes in FIG. 1A are each labeled with a predicted time to travel between the two nodes connected by the edge. For example, at a starting time T1 represented by the graph, the predicted time to travel between node A and node B is 12 minutes and the predicted time to travel between node A and node C is 17 minutes. Similarly, for someone departing node B at starting time T1 and heading toward node D along edge BD (with an edge being represented by the node labels at the two ends of the edge), the predicted time for travel is 15 minutes. In other embodiments, other types of predicted information may instead be used as part of such travel route selection, such as predicted traffic congestion or predicted average speed.

Figure 1B:
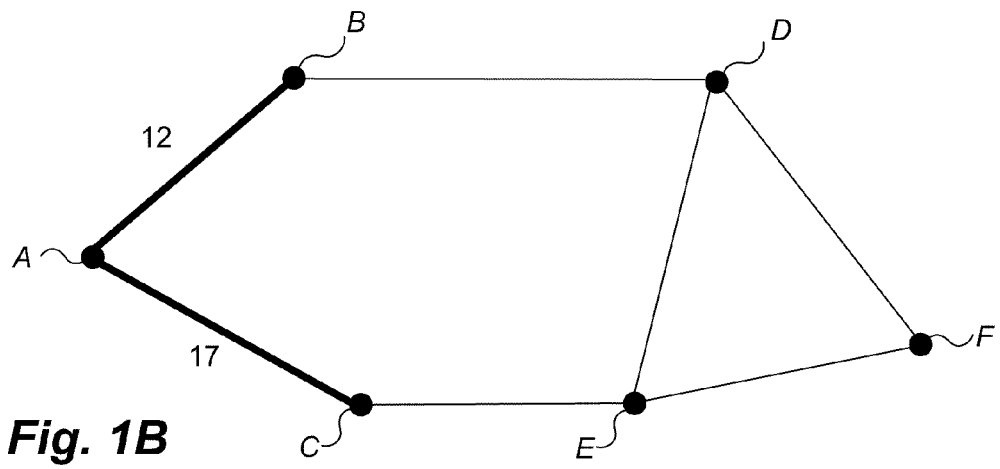
Figure 1C:
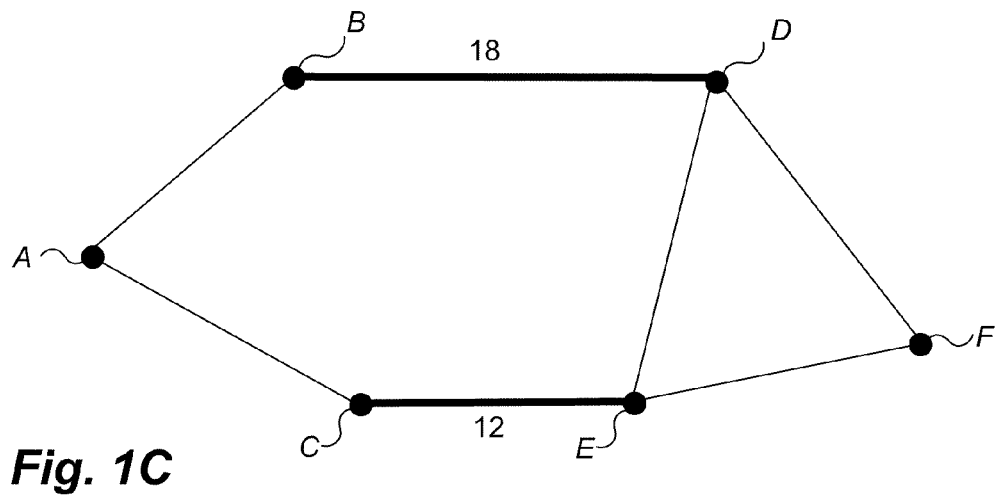
Figure 1D:
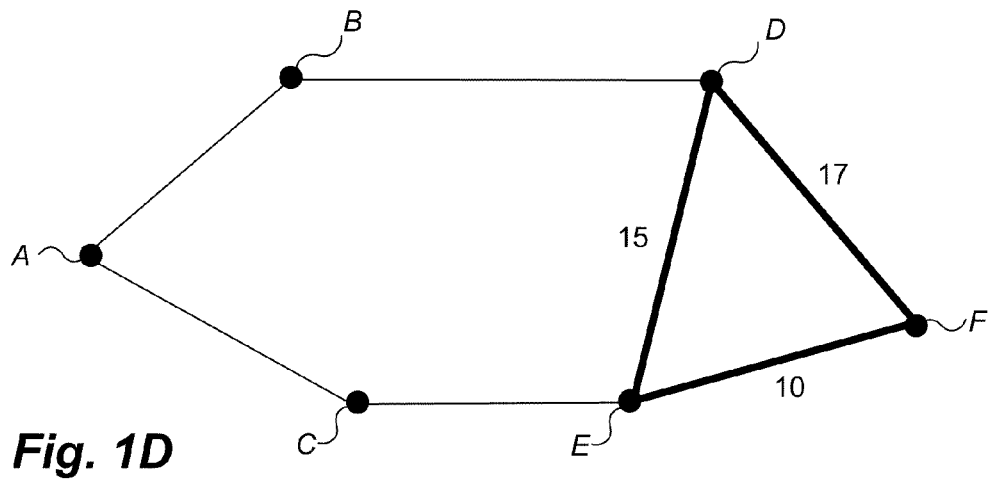

Thus, FIG. 1A illustrates the entire route graph at a single starting time T1 (e.g., 5 PM), such as for edges traveled by vehicles starting at any of the graph nodes at that starting time. Conversely, FIGS. 1B-1E illustrate various views showing predicted traffic condition information for multiple future times for use by the route selection process from node A to node F, with the intervals between each of the future times in this example being 15 minutes. For example, FIG. 1B illustrates a portion of the route graph based on predicted travel times for time T1 that are for use during a first time period beginning at starting time T1 and continuing until time T2, which in this example is a 15-minute time period from 5 PM until 5:15 PM, but shows only predicted time information that is relevant during that first time period for the route selection process, which in this example is for edges AB and AC. In particular, since edges beyond nodes B and C will not be reached in this example until the first time period is complete or substantially complete, the predicted traffic information at time T1 5 pm for edge CE (for example) is not of use since a vehicle would not reach that edge until a second time period of 5:15 pm-5:30 pm. Accordingly, FIG. 1C illustrates predicted travel information for the route graph during the second time period, such as based on predicted travel times for time T2 5:15 PM, with only predicted travel times for edges BD and CE shown since those edges correspond to road segments that would possibly be traveled by a vehicle that left node A at 5 pm. Similarly, FIG. 1D illustrates the route graph during a third time period between 5:30 and 5:45 PM, such as based on predicted travel times for time T3 5:30 PM, with the predicted travel times for edges DF, DE, and EF shown since those edges correspond to road segments that could be traveled by a vehicle that left node A at 5 pm. For purposes of simplification for this example, predicted travel times during a fourth time period between 5:45 PM and 6 PM (such as based on predicted travel times for time T4 5:45 PM) for edges DF, DE, and EF are the same as the predicted travel times for those edges during the third period, and the fourth time period times are not illustrated separately.

Figure 1E:
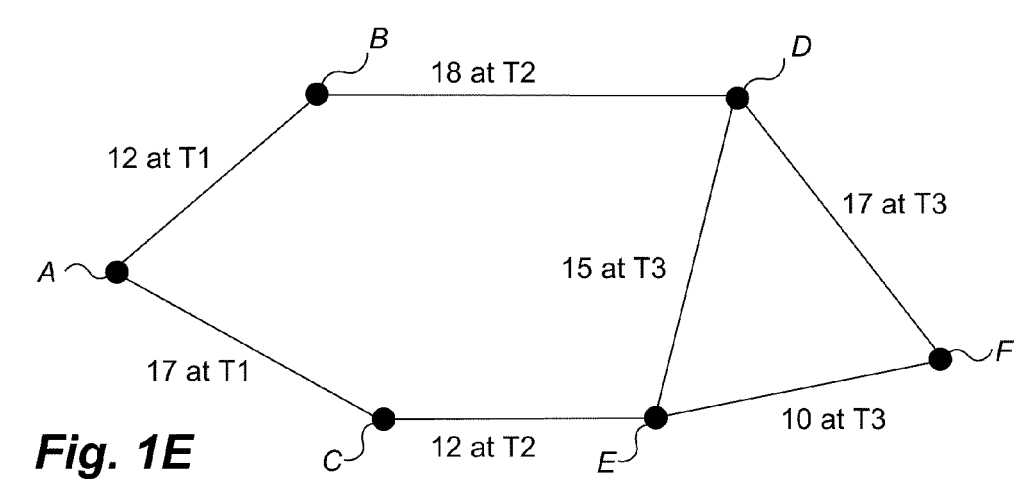

FIG. 1E illustrates a combined view of the information displayed in FIGS. 1B-1D, with predicted travel times for multiple future times being displayed. In particular, the edges are labeled with the predicted travel times that correspond to the time periods during which a vehicle traveling from source node A to destination node F would be expected to be traversing the route segments corresponding to the graph edges, with information displayed from left to right in the graph generally reflecting predictions relating to successively later time periods. Thus, the graph shows that the predicted travel time from A to B during the first time period is 12 minutes; from A to C during the first time period is 17 minutes; from B to D during the second time period is 18 minutes; from C to E during the second time period is 12 minutes; from D to E during the third time period is 15 minutes; from D to F during the third time period (and the fourth time period) is 17 minutes; and from E to F during the third time period (and the fourth time period) is 10 minutes.

Using the predicted travel times for these multiple time periods shown in FIG. 1E, it is possible to select the optimal route (in this example, the fastest route) from source node A to destination node F. In this simple example, total travel times for possible routes between the source and destination nodes are as follows (not counting routes in which a vehicle backtracks over a previously traveled edge): ABDF (total time=47); ABDEF (total time=55); ACEF (total time=39); and ACEDF (total time=61). Thus, based on the predictions made at the current time for the multiple future time periods, route ACEF will be the fastest route between source node A and destination node F, with an expected travel time of 39 minutes.

Returning to FIG. 1A, in which the predicted times for the entire route graph during the first time period are shown, this route group illustrates how a non-optimal route would be selected using this information since predicted travel times for future time periods are not considered. In particular, the predicted travel times for the same 4 routes using only the predicted first time period travel times are as follows: ABDF (travel time=37); ABDEF (travel time=60); ACEF (travel time=45); and ACEDF (travel time=52). Thus, this less-accurate information would have erroneously indicated that route ABDF would be the fastest route between source node A and destination node F with a time of 37 minutes, rather than the 47 minutes for that route that are indicated by using the predicted travel times indicated in FIG. 1E. Such inaccuracies may have arisen, for example, due to predicted increases in traffic congestion after the first time period, such as due to a scheduled event that causes traffic to significantly increase during the second and third time periods.

Figure 1F:
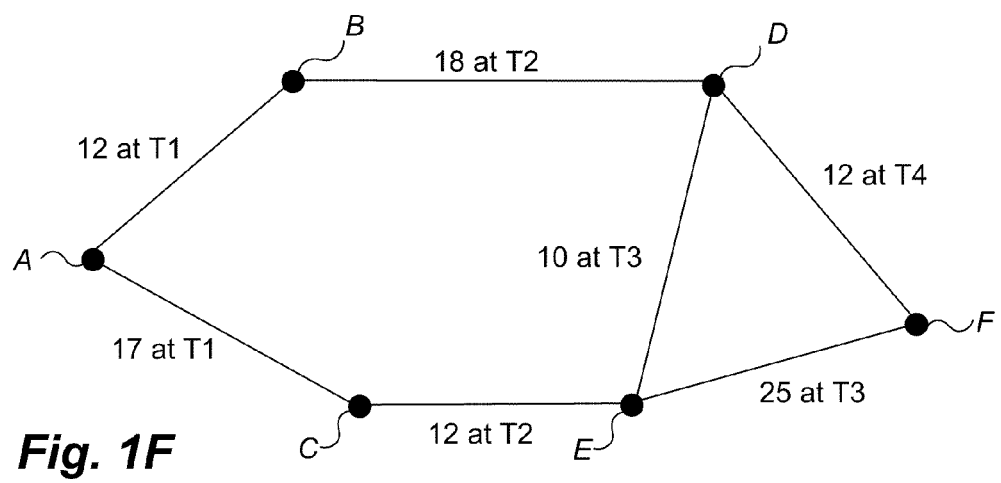

FIG. 1F shows a revised view of the information shown in FIG. 1E, and in particular shows updated predicted travel times for the third and fourth time periods with respect to edges DF, DE and EF. In this example, the updated predicted travel information is generated during the second time period based on new input information that became available at that time (e.g., an accident that occurred along a road corresponding to edge EF, thus significantly increasing predicted travel time for that edge), which may alter optimal routes between nodes in the graph. Such updated information may be particularly beneficial if it can be rapidly provided to users that are affected by changes in the predicted travel information. For example, a user who had begun traveling along route ACEF based on the predicted travel information shown in FIG. 1E would be traveling along a road corresponding to edge CE when the updated information becomes available, but the updated information indicates that traveling edge EF is no longer the optimal choice from node E—instead, traveling a revised route ED and DF is now predicted to take less time than the original edge EF route. If the user can be quickly notified while in transit, the user can thus dynamically adjust the route being taken to reflect the new predicted traffic information at multiple future time periods. Moreover, if the updated travel information had become available early in the first time period before a user had departed from node A, the user could be directed toward a new optimal route of ABDF.

Thus, FIGS. 1B-1F illustrate examples of using predicted future traffic conditions at multiple future times to provide benefits with respect to route planning.

FIGS. 2A-2F illustrate various graphical representations of example predictive models for representing knowledge about traffic conditions in a given geographic area. In some embodiments, such predictive models are automatically generated, maintained, and utilized to make predictions and/or forecasts regarding future traffic conditions at multiple future times, such as to predict future time series data for each road segment of interest. Such predictive models may include, but are not limited to, Bayesian or belief networks, decision trees, hidden Markov models, autoregressive trees, and neural networks. Some such predictive models may be probabilistic models, such as Bayesian network models, and such predictive models may be stored as part of one or more data structures on one or more computer-readable media.

FIGS. 2A-2D illustrate an example of the generation of a Bayesian network for representing probabilistic knowledge about traffic conditions. A Bayesian network is a directed acyclic graph ("DAG") consisting of nodes and edges. The nodes in the graph represent random variables, which may have discrete or continuous values that represent states in the domain being modeled. The edges in the graph represent dependence relationships between the variables. Nodes with no parents are root nodes. The probability distributions of root nodes are unconditional on any other nodes in the graph. A node with one or more parents has a probability distribution that is conditional on the probabilities of its parent nodes. By specifying the prior probabilities of the root nodes and the conditional probabilities of the non-root nodes, a Bayesian network graph can represent the joint probability distribution over all of the variables represented by nodes in the graph.

Figure 2A:
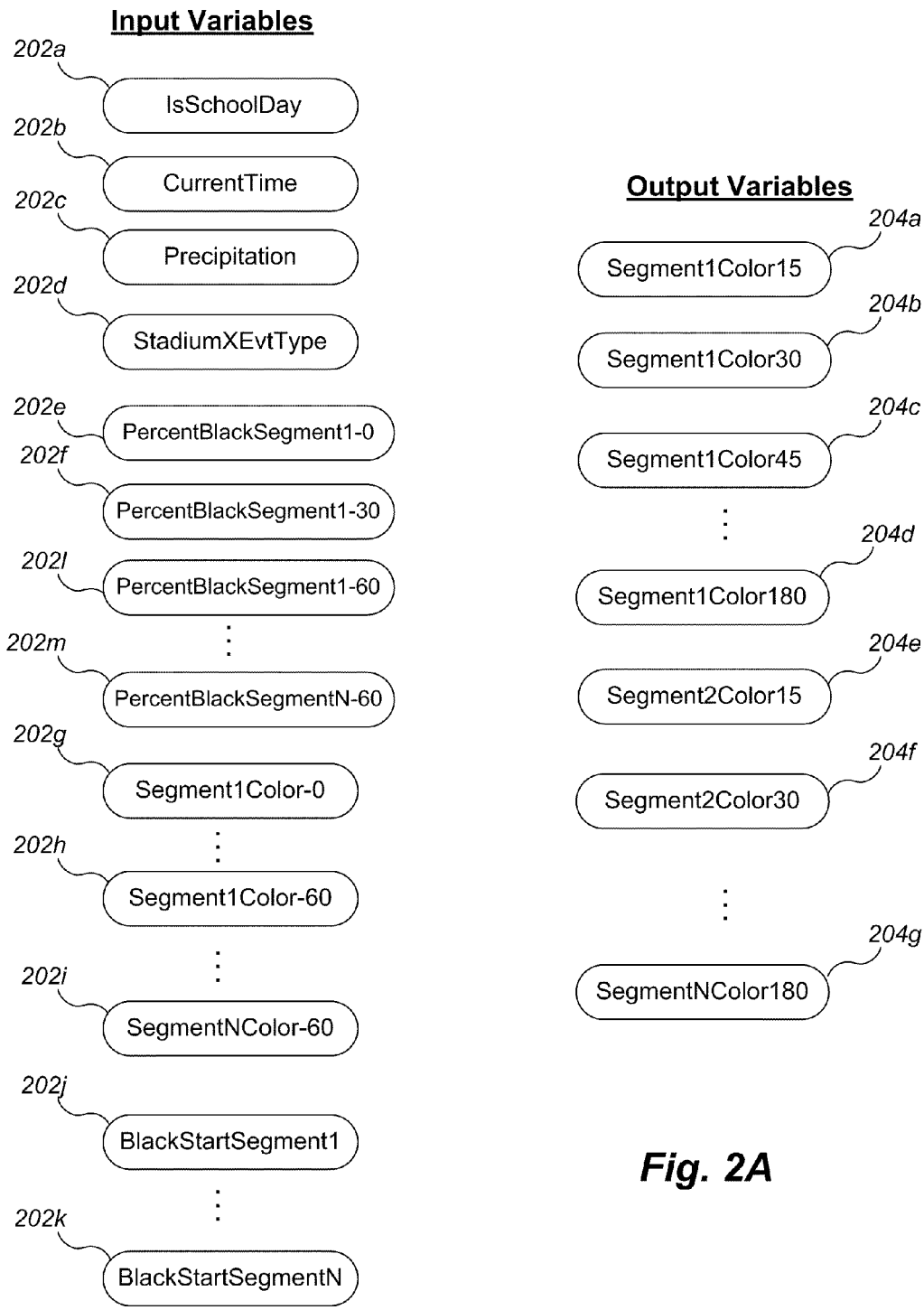

FIG. 2A illustrates an example collection of nodes that may be used to generate a Bayesian network predictive model for use in predicting traffic conditions. The illustrated nodes correspond to variables for which observed input data may be received, and to traffic conditions predictions that may be output with respect to a particular geographic area. In particular, nodes 202*a-m* represent various input variables for use in the predictive model, which in this example will correspond to root nodes in the Bayesian network that will be generated. The example input variables are as follows. Node 202*a* labeled IsSchoolDay may be used to represent whether school is in session on a particular day. Node 202*b* labeled CurrentTime may be used to represent the time of day. Node 202*c* labeled Precipitation may be used to represent an amount of precipitation over a particular time interval (e.g., the past 6 hours) or alternatively a current rate of precipitation. Node 202*d* labeled StadiumXEvtType may be used to represent the type of event (if any) that is scheduled for or currently taking place at stadium X. Nodes 202*e*, 202*f* and 202*l-m* may each be used to represent the traffic conditions on a particular road segment at the present time or at some time in the past, and in particular to represent the percentage of individual data sources (e.g., traffic sensors or other data sources) for that road segment that are reporting black (e.g., highly congested) traffic conditions at the time being represented—as previously noted, each road segment may be associated with one or more traffic sensors and/or with one or more other sources of traffic condition information for that road segment, as described in greater detail elsewhere. In some embodiments, traffic congestion level data for road segments is represented using colors (e.g., green, yellow, red, black) corresponding to enumerated increasing levels of traffic congestion, with green thus corresponding to the lowest level of traffic congestion and black corresponding to the highest level of traffic congestion. These nodes in this example are labeled PercentBlackSegmentX-Y, where X refers to a particular road segment and Y refers to a time in the past (e.g., in minutes, or other unit of time measurement) for which the percentage level of highly congested traffic on that road segment is being reported. For example, node 202*f* labeled PercentBlackSegment1-30 may be used to represent the percentage of black-level congestion for road segment Segment1 30 minutes ago.

Nodes 202*g-i* may each be used to represent the average or most common traffic conditions on a particular road segment at the present time or at some time in the past. These nodes are labeled SegmentXColor-Y in this example, where X refers to a particular road segment and Y refers to a time in the past (e.g., in minutes, or other unit of time measurement) at which a particular level of traffic congestion on that road segment has been identified (with the traffic congestion level represented here with its corresponding color). For example, node 202*h* labeled Segment1Color-60 may be used to represent the traffic conditions 60 minutes ago on road segment Segment1, with the level of traffic congestion at that time being illustrated with the appropriate congestion color. Nodes 202*j-k* may each be used to represent how long the levels of traffic congestion for a particular road segment have been continuously reported as being black. For example, node 202*j* labeled BlackStartSegment1 may be used to represent how long the level of traffic congestion on road segment Segment1 has been continuously reported as being black. A variety of other input variables may be used in other embodiments, such as to provide additional details related to various of the types of conditions shown or to represent other types of conditions, as discussed in greater detail below.

Nodes 204*a-g* in FIG. 2A represent output variables in the predictive model, and in particular correspond to predictions regarding traffic conditions that may be made given prior probabilities assigned to input nodes 202*a-m* and any current input information for those input nodes. Each output node 204*a*-204*g* in this example is labeled SegmentXColorY, where X refers to a particular road segment and Y refers to a time in the future for which a particular color corresponding to a level of traffic congestion on that road segment is predicted. For example, node 204*a* labeled Segment1Color15 may be used to represent the predicted traffic conditions on road segment Segment1 at 15 minutes in the future. For each road segment, traffic conditions are represented for a number of future times. For example, nodes 204*a*-204*d* represent the predicted traffic conditions on road segment Segment at 15-minute intervals over a three hour-long window into the future. In the illustrated embodiment, traffic conditions on N road segments are represented, each having 12 nodes corresponding to the twelve 15-minute time intervals over which traffic conditions are to be predicted. In other embodiments, larger or smaller future time windows and/or more or less time intervals may be represented.

FIG. 2B illustrates the possible values that may be taken by the variables corresponding to nodes depicted in FIG. 2A. In table 210, column 212*a* lists the variable name and column 212*b* lists the possible values the corresponding variable may take, which may be either continuous or discrete. Rows 214*a-g* each list an individual variable name and its corresponding range of values. For example, row 214*a* illustrates that the IsSchoolDay input variable may take the values true or false, corresponding to the observation that the current day is a school day or not, while row 214*b* illustrates that the Precipitation input variable may take one of the enumerated values of none, low, medium, or high. In this example, precipitation is measured as a discretized quantity over a fixed time interval for the sake of simplicity, although in other embodiments precipitation may be represented instead in other manners (e.g., as a continuous quantity of rain over a fixed time interval, as a current rate of rainfall, etc.). Row 214*c* illustrates that the StadiumXEvtType input variable may take one of the values none, football, concert, soccer, or other, although in other embodiments the event type may take on a greater or lesser number of possible values (e.g., a Boolean value indicating whether or not there is an event). Row 214*d* illustrates that each PercentBlackSegmentX-Y input variable may take a real numbered value in the closed interval from 0.0 to 1.0, representing the percentage of data points (e.g., road sensor readings, mobile data source values, etc.) or other sub-segments for the road segment SegmentX on which black traffic congestion level conditions are being reported at the corresponding time Y minutes in the past. Row 214*e* illustrates that each BlackStartSegmentX input variable may take one of the values notblack, 0, 5, 10, 15, . . . 30, with the "notblack" value indicating that the road segment SegmentX has not had a black traffic congestion level condition in the last 30 minutes, and with the other values indicating the closest number of minutes during the last 30 minutes that black traffic conditions have been continuously reported on the road segment SegmentX prior to the current time. For example, a value of 10 means that black traffic conditions have been continuously reported for approximately the last 10 minutes, and a value of 0 means that black traffic conditions have been continuously reported for zero minutes (or for less than 2% minutes if time is rounded down) but that black conditions have previously been present during the last 30 minutes (otherwise, the notblack value would be used). Row 214*f* illustrates that the SegmentXColorY output variable may take one of the enumerated values green, yellow, red, or black, corresponding to increasing levels of traffic congestion reported on road segment X at Y minutes in the future. Row 214*g* illustrates that additional possible values for additional variables may be represented.

FIG. 2C illustrates a collection of example data corresponding to observations made regarding traffic conditions in a given geographic area. Each row represents an observation record consisting of related observations for each of multiple of the variables in the predictive model, such as to reflect a particular time or situation. In table 220, columns 222*a*-222*f* correspond to input variables represented by nodes 202*a-m* in FIG. 2A and columns 222*g*-222*j* correspond to output variables represented by nodes 204*a-g* in FIG. 2A, with some nodes not represented for the sake of clarity. For example, row 224*a* illustrates a first observation record corresponding to an observation at a time at which school was in session; no precipitation had been measured; a soccer event was scheduled to be occurring in stadium X; black traffic congestion level conditions were reported for 22 percent of road segment SegmentX at a time Y minutes ago; and black traffic congestion level conditions were continuously reported on road segment SegmentN for approximately zero minutes. In addition, 15 minutes after the above observations were made, red traffic congestion level conditions were reported on road segment Segment1; black traffic congestion level conditions were reported on road segment Segment1 30 minutes after those observations; and yellow traffic congestion level conditions were reported on road segment SegmentN 180 minutes after those observations. Rows 224*b-g* similarly illustrate additional observation records, and it will be appreciated that actual observation data may include very large numbers of such observations.

Figure 2D:
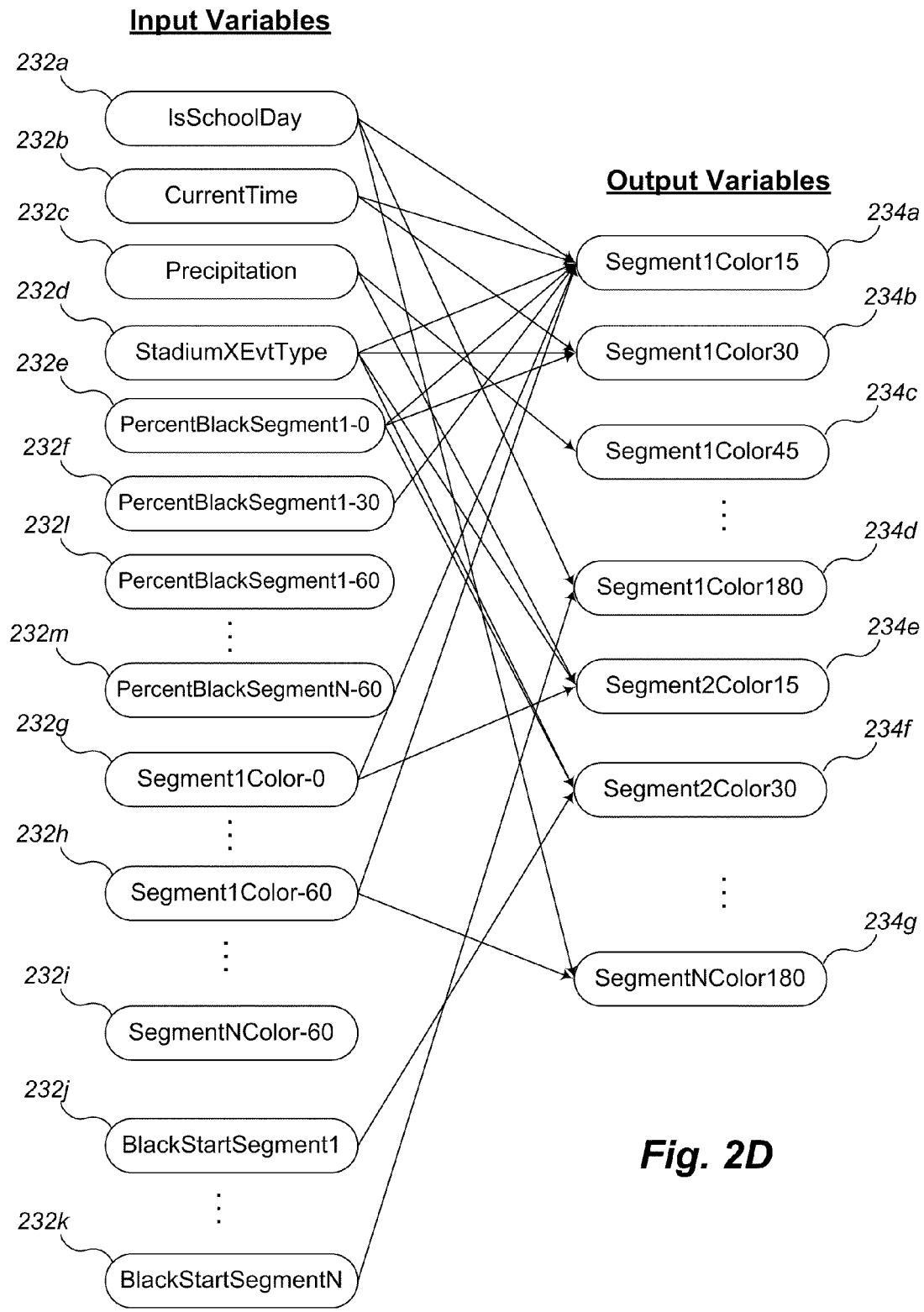

FIG. 2D illustrates an example Bayesian network that may be generated based on observation data such as that illustrated in FIG. 2C, and that may be used as a predictive model for generating future traffic conditions predictions. As is shown, the nodes depicted in FIG. 2D represent the same input and output variables as the nodes as in FIG. 2A, but arcs now connect the input variable nodes 232*a-m* to the output variable nodes 234*a-g* such that each of the output nodes is now the child of one or more of the input nodes 232*a-m* corresponding to input variables. Each arc directed from a parent node to a child node represents dependence between the child node and the parent node, meaning that the observed data from which the Bayesian network structure was generated indicates that the probability of the child node is conditional on the prior probability of its parent node. For example, node 234*c* in this example has a single parent node 232*c*, which can be understood to mean that the probability of the output variable Segment1Color45 represented by node 234*c* is conditional on the prior probability of the Precipitation input variable represented by node 232*c*. Thus, when input information is currently obtained for the Precipitation input variable, a predicted value for the traffic congestion level color of road segment Segment1 at future time 45 minutes can be determined. If a child node has multiple parent nodes, its probability is conditional on the probabilities of all combinations of its multiple parent nodes. For example, output node 234*a* has seven parent nodes in this example, those being input nodes 232*a*, 232*b*, 232*d*, 232*e*, 232*f*, 232*g* and 232*h*, which can be understood to mean that the probability of the output variable Segment1Color15 represented by node 234*a* is conditional on the prior probabilities of the input variable IsSchoolDay represented by node 232*a*, the input variable CurrentTime represented by node 232*b*, the input variable StadiumXEvtType represented by node 232*d*, the input variable PercentBlackSegment1-0 represented by node 232*e*, the input variable PercentBlackSegment1-30 represented by node 232*f*, the input variable Segment1Color-0 represented by node 232*g*, and the input variable Segment1Color-60 represented by node 232*h*.

Intuitively, the Bayesian network may be understood to represent causal relationships. For example, the illustrated Bayesian network expresses causal relationships between input factors such as school schedules, stadium events, weather, and current and past traffic conditions (as represented by input nodes 232*a-m*) and output future traffic conditions on various road segments (as represented by output nodes 234*a-g*). As one specific example, the traffic conditions reported 60 minutes ago on road segment Segment1 and whether it is a school day may influence the traffic conditions 180 minutes in the future on road segment SegmentN, such as if road segments Segment1 and SegmentN are related (e.g., are nearby to each other) and if significant traffic reported on road segment Segment1 on school days has a later impact on road segment SegmentN. This relationship is depicted in FIG. 2D by way of arcs from each of node 232*a* labeled IsSchoolDay and node 232*h* labeled Segment1Color-60 to node 234*g* labeled SegmentNColor180.

The structure and probability distributions of a Bayesian network such as that depicted in FIG. 2D may be generated from observation data via learning algorithms that determine the corresponding relationships and values, such as to determine a network structure that best matches the given observation data. In addition, at least some such learning algorithms can proceed with incomplete data (e.g., such as where some of the observation records are missing some data elements), and may further in some embodiments generate more complicated network structures (e.g., by identifying and representing one or more levels of intermediate nodes between the input nodes and output nodes, such as to reflect high-level relationships between groups of input nodes and/or output nodes). Additional details related to one set of example techniques for use in some embodiments for generating a Bayesian network based on observed case information are included in "A Tutorial on Learning Bayesian Networks,"

David Heckerman, March 1995, Technical Report MSR-TR-95-06 from the Microsoft Research Advanced Technology Division of Microsoft Corporation and available at ftp://ftp.research.microsoft.com/pub/tr/tr-95-06.pdf, which is hereby incorporated by reference in it entirety.

FIGS. 2E-J depict example decision trees that may each be generated based on observation data, such as that illustrated in FIG. 2C and in conjunction with the example Bayesian network illustrated in FIG. 2D, and that may each be used as part of a predictive model for generating future traffic conditions predictions for a particular road segment at a particular future time. As previously noted, a Bayesian network such as the one depicted in FIG. 2D indicates probabilistic relationships between various variables. A decision tree allows a subset of such relationships to be encoded in a manner that may be used to efficiently compute a predicted value for an output variable given a set of input values. In particular, a decision tree includes numerous decisions arranged in a tree structure, such that possible answers to a decision each lead to a different sub-tree based on that answer, and with the decisions and answers arranged so as quickly split multiple cases with different outcomes into different sub-trees. Given a set of observation data such as that shown in FIG. 2C, decision trees such as those shown in FIGS. 2E-J may be automatically generated via learning algorithms that determine the best decisions and answers to include in the decision tree and the best structure of the tree to facilitate rapid decisions based on input data to reflect current conditions. Additional details related to one set of example techniques for use in some embodiments for generating decision trees based on observed case information and/or a corresponding Bayesian network are included in "Scalable Classification over SQL Databases," Surajit Chaudhuri et al., Microsoft Research Division of Microsoft Corporation, March 1999, Proceedings of 15th International Conference on Data Engineering, Sydney, Australia and available at ftp://ftp.research.microsoft.com/users/AutoAdmin/icde99.pdf, which is hereby incorporated by reference in its entirety.

In the illustrated embodiment, each decision tree is used to generate the predicted traffic congestion level conditions on a single road segment at a single future time given current condition information for input variables. As described in more detail with reference to FIGS. 2A-D, in some embodiments, at each of one or more successive current times, traffic conditions for multiple future times are modeled based on the information available at the current time of the modeling, such as every 15 minutes of a three-hour time interval, resulting in twelve decision trees per modeled road segment. In FIGS. 2E-2J, the decision tree nodes are each labeled with a variable name corresponding to one of the input variables described with reference to FIGS. 2A-D, and the arcs emanating from a given node representing an input variable are each labeled with one or more of the possible values that may be taken by the variable. A path is determined by starting at the root node of the tree, using the value in the set of input data corresponding to the variable represented by that node to determine which arc to follow to a child node, and repeating the process for each successive children along the path until a leaf node is reached. In FIGS. 2E-J, leaf nodes are rectangular in shape, and each represent a most likely future traffic congestion level prediction for the given set of input data.

FIG. 2E shows a portion of an example decision tree for predicting future traffic congestion levels for road segment Segment1 at a future time of 15 minutes, and in particular illustrates a single path from the root node to possible leaf nodes, although it will be understood that in an actual decision tree numerous other paths will similarly lead to other such possible leaf nodes. In this example, the root node 240 of the illustrated decision tree corresponds to the IsSchoolDay input variable, with the path leading to node 242b being followed if it is currently a school day and with the path leading to node 242a being followed otherwise. Node 242a represents the Segment2Color-15 input variable, with possible values of the traffic congestion color (e.g., green, yellow, red, black) of road segment Segment2 fifteen minutes in the past leading to nodes 244a-d as shown. For example, if it is currently determined that black was reported 15 minutes ago on this road segment, the path to node 244d is followed, which represents the Precipitation input variable. Possible values of the Precipitation input variable from node 244d lead to nodes 246a-d as shown. For example, if the current measured precipitation is medium, the path to node 246c is followed, which represents the StadiumXEvtType input variable. Possible values of the StadiumXEvtType input variable lead to leaf nodes 248a-e as shown, with each of these leaf nodes representing an associated predicted future traffic congestion level on road segment Segment1 at a future time of 15 minutes. In this example, each leaf node is also labeled with a confidence level associated with the predicted future traffic congestion level (as shown by the value in parenthesis), such as may be determined in various ways. As one example, node 248d indicates that if a football game is currently scheduled, then a red traffic congestion level condition on road segment Segment1 is predicted for future time 15 minutes with a confidence level of 64%, while node 248c indicates that if a soccer game is instead currently scheduled then green traffic congestion level conditions are predicted on road segment Segment1 for future time 15 minutes with a confidence level of 47%. This difference may be attributed, for example, to the relative attendance and corresponding traffic for events of the two sports within the given geographic area, to different schedules (e.g., start, duration or end times) for such types of events, and/or to different patterns of traffic flow before and/or after the event (e.g., concert attendees may tend to arrive and/or depart en masse, whereas sporting event attendees may tend to arrive and/or depart more sporadically over larger time intervals).

Figure 2F:
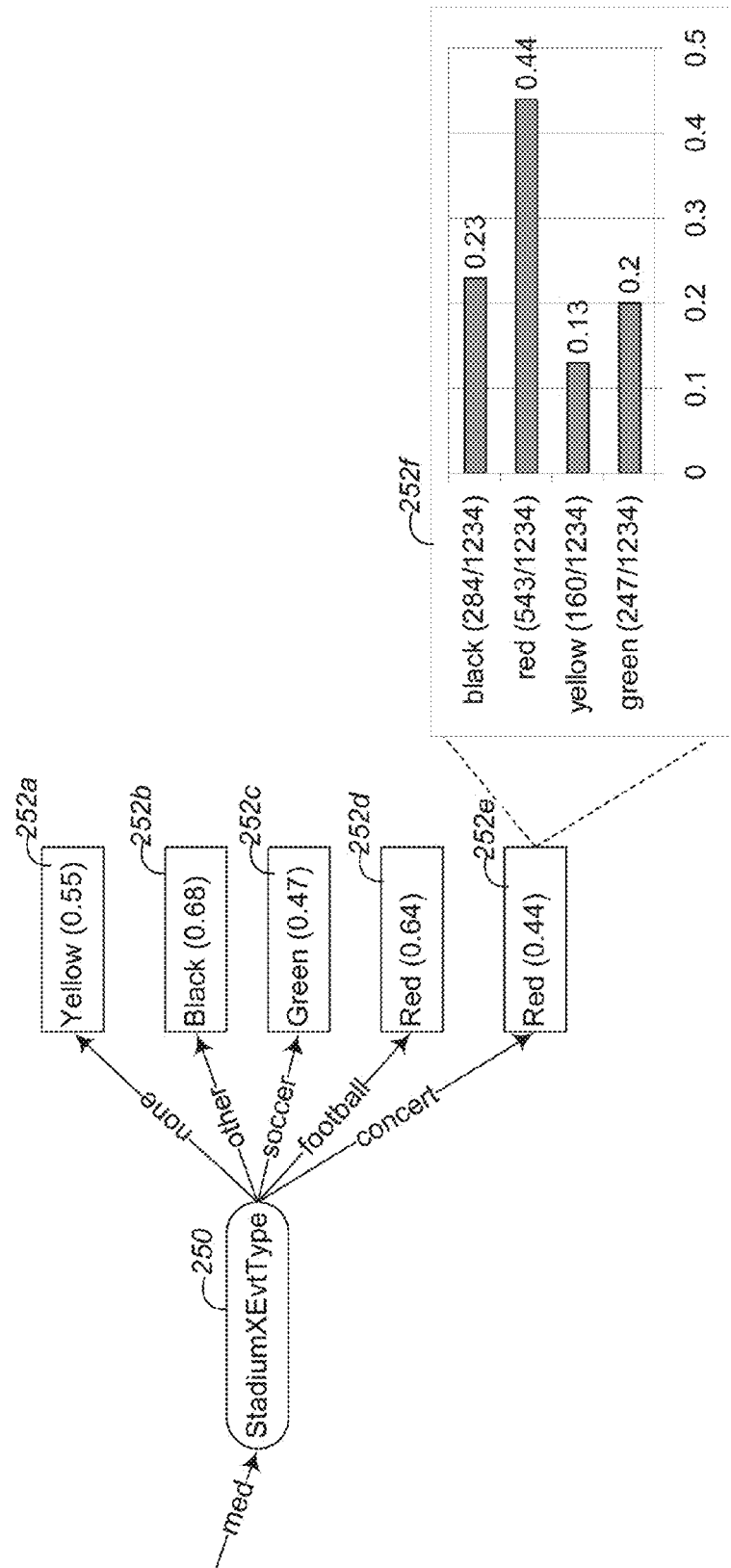

FIG. 2F shows a detailed view of one example leaf node of the example decision tree of FIG. 2E. In particular, a detailed view of leaf node 252e is shown, which corresponds to the leaf node 248e of FIG. 2E. FIG. 2F shows a histogram 252f for node 252e, which illustrates a probability distribution over all possible outcomes for node 252e in the observed data used to generate the decision tree. In this example, the histogram 252f shows the four possible traffic congestion level values (e.g., black, red, yellow, green) and the associated frequency of each value from the observed data. As can be seen from the histogram, the outcome with the highest frequency is a red traffic congestion level, with a frequency of 44% of the observed cases (shown as being the outcome in 543 of 1234 observed cases). In this example, the highest frequency outcome will be selected as the predicted outcome at a particular leaf node, and the frequency of that particular outcome in the observed data will be selected as the confidence value for the prediction. In other embodiments, confidence values may be determined in other manners, such as based on a relationship of the highest frequency outcome to an overall mean, median, or other statistical aggregate measure of the outcomes.

Figure 2G:
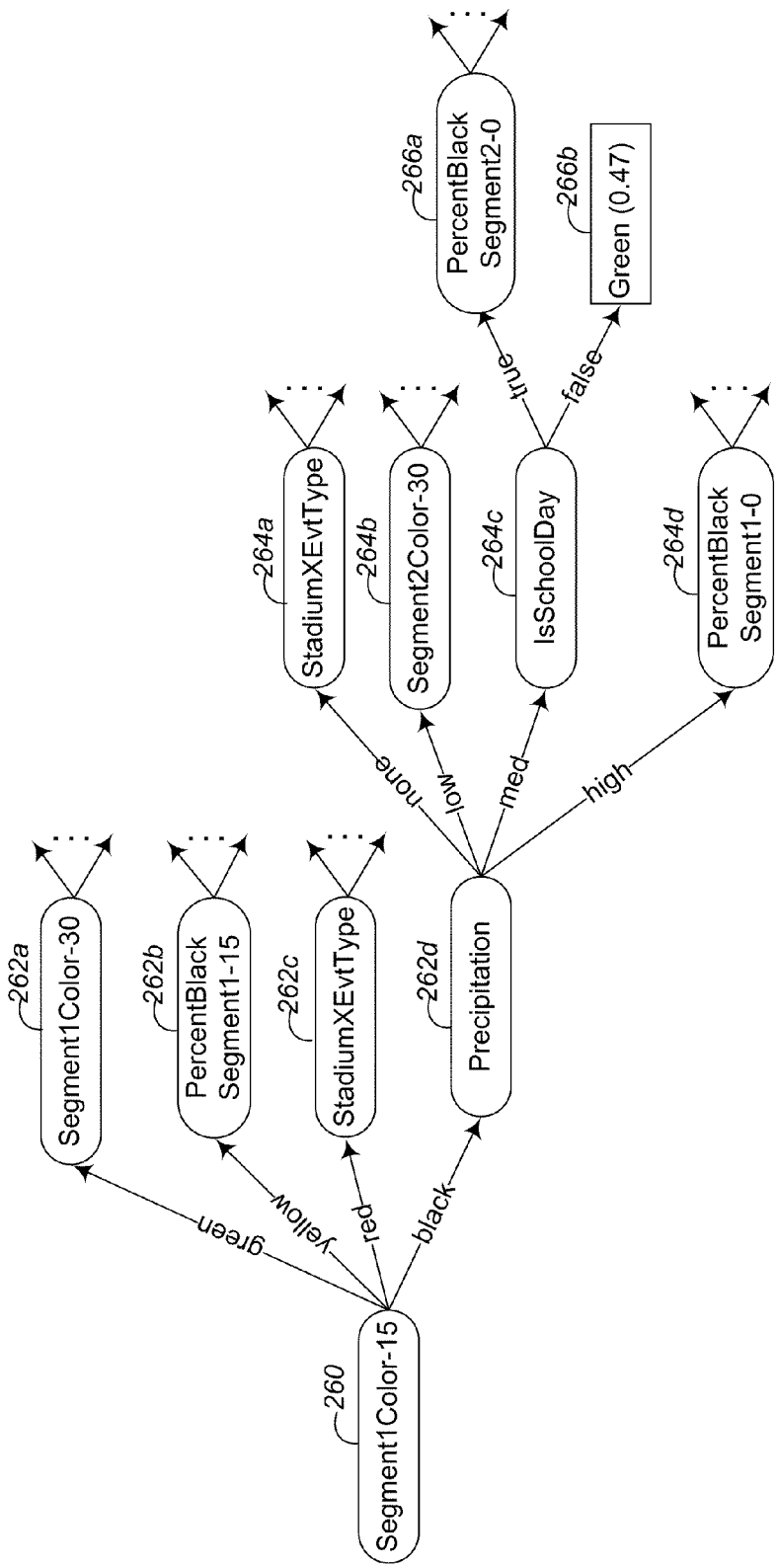

In a manner similar to that of FIG. 2E, FIG. 2G shows a portion of another example decision tree for road segment Segment1, with this decision tree representing predicted future traffic congestion levels for road segment Segment1 at a future time of 30 minutes. In particular, this decision tree illustrates a path from root node 260 to a leaf node 266*b*, which results in a most likely prediction of green traffic congestion level conditions with an associated confidence value of 47% based on input conditions corresponding to that path. In this example, the structure of the decision tree of FIG. 2G differs from that of the decision tree of FIG. 2E, even though it is used to compute predictions for the same road segment, based on the observed data reflecting different relevant factors for 30-minute future predictions than for 15-minute future predictions. For example, the decision tree of FIG. 2G begins with node 260 that corresponds to the input variable Segment1Color-15, whereas the decision tree of FIG. 2E begins with node 240 that corresponds to the input variable IsSchoolDay.

Figure 2H:
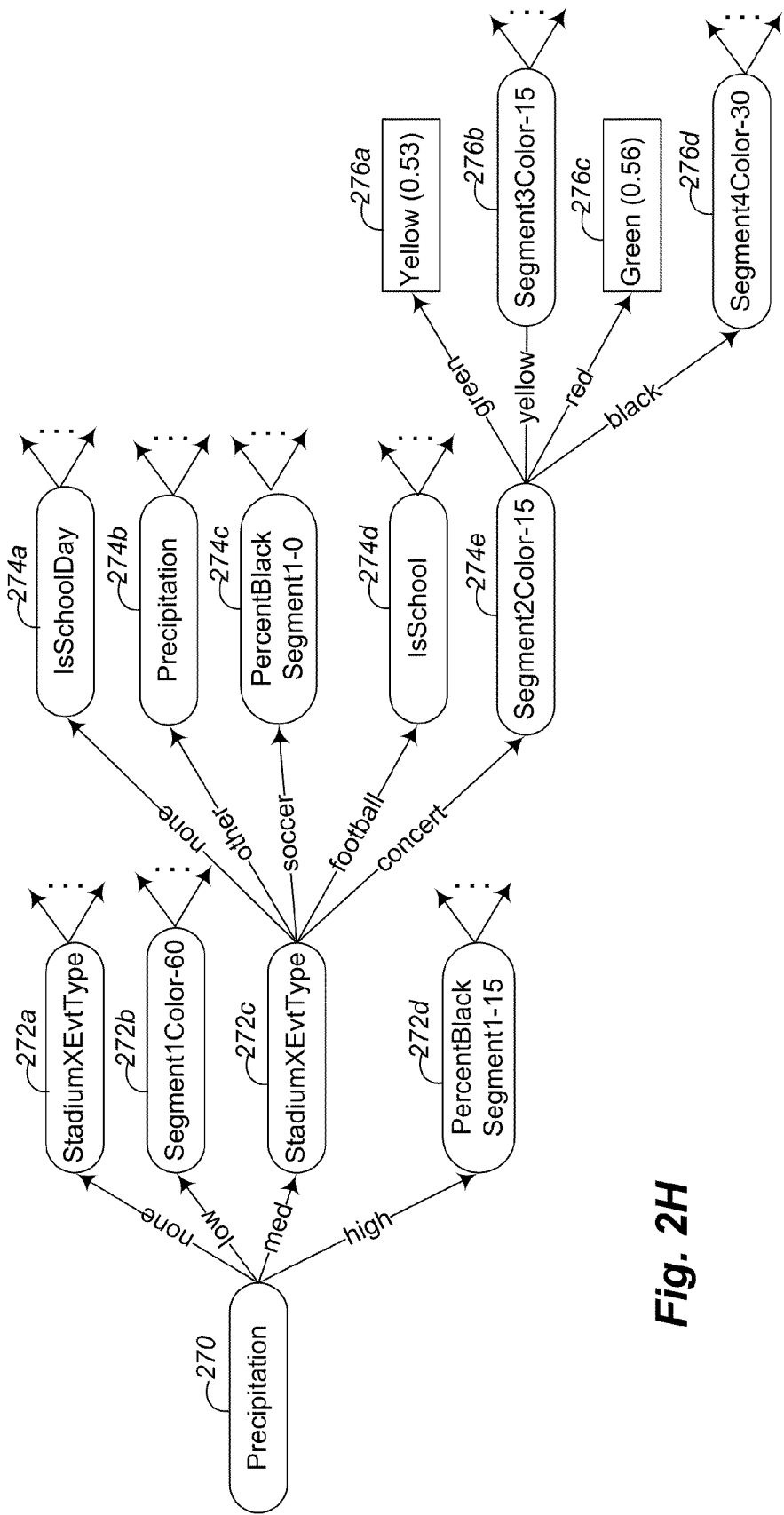

FIG. 2H shows a portion of an example decision tree for predicting future traffic congestion levels for road segment Segment1 at a future time of 60 minutes. In a similar manner to that of FIG. 2G, the structure of this decision tree differs from that of the tree in FIG. 2E, as well as that of FIG. 2G. This decision tree shows a path from root node 270 to a leaf node 276*a* that yields a most likely prediction of yellow traffic congestion level conditions with an associated confidence value of 53%. In addition, this decision tree shows a second path from root node 270 to a leaf node 276*c* that yields a most likely prediction of green traffic congestion level conditions with an associated confidence value of 56%.

Figure 2I:
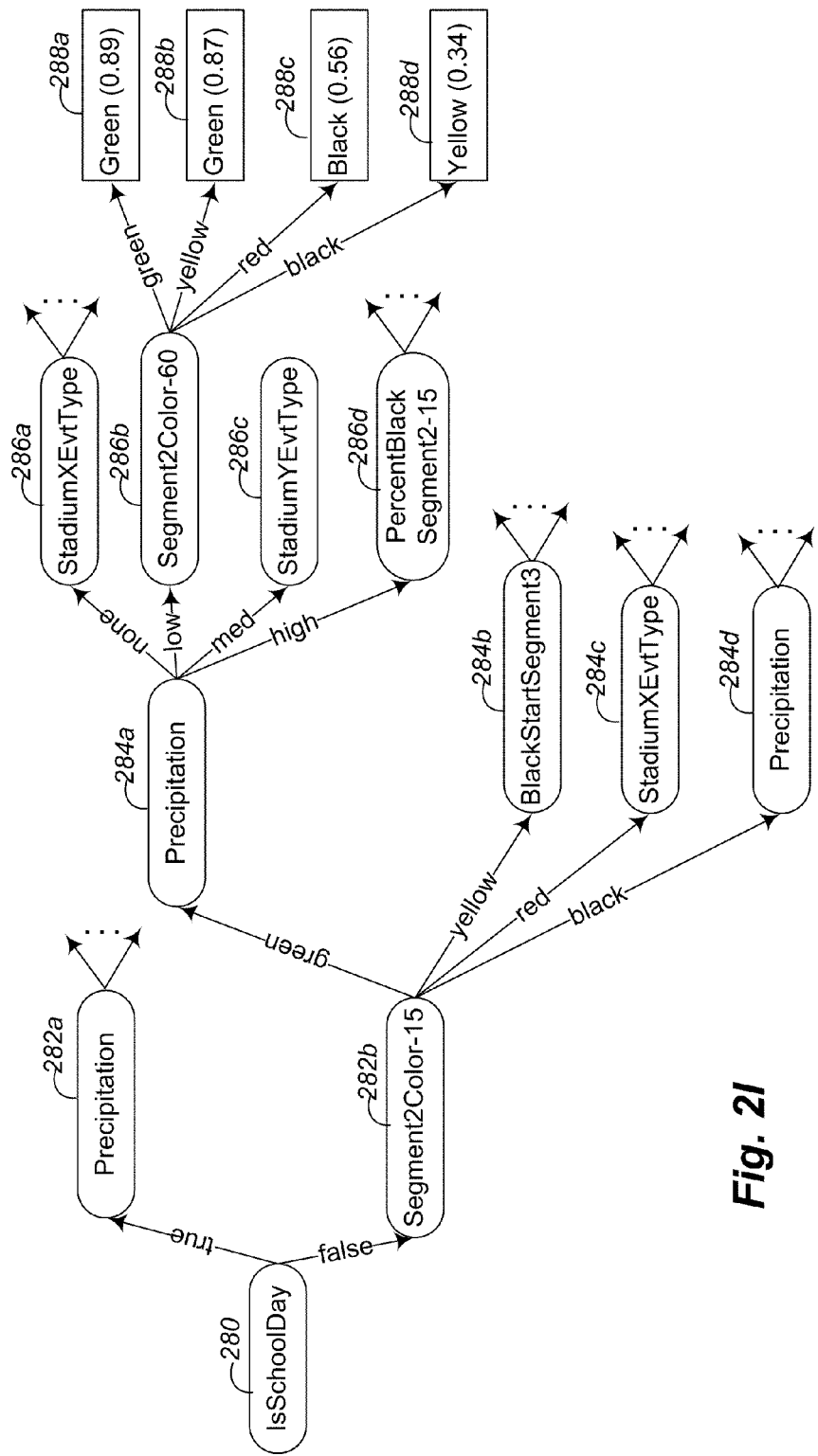

FIG. 2I shows a portion of an example decision tree for predicting future traffic congestion levels for road segment Segment2 at a future time of 30 minutes. This decision tree may be used to predict traffic conditions for road segment Segment2, as opposed to road segment Segment1 as depicted in FIGS. 2E, 2G, and 2H, but otherwise has a similar structure and use as the previously discussed decision trees. This decision tree shows four paths from root node 280 to leaf nodes 288*a-d*, which result in most likely predictions of green, green, black, and yellow traffic congestion level conditions with associated confidence values of 89%, 87%, 56%, and 34%, respectively.

Figure 2J:
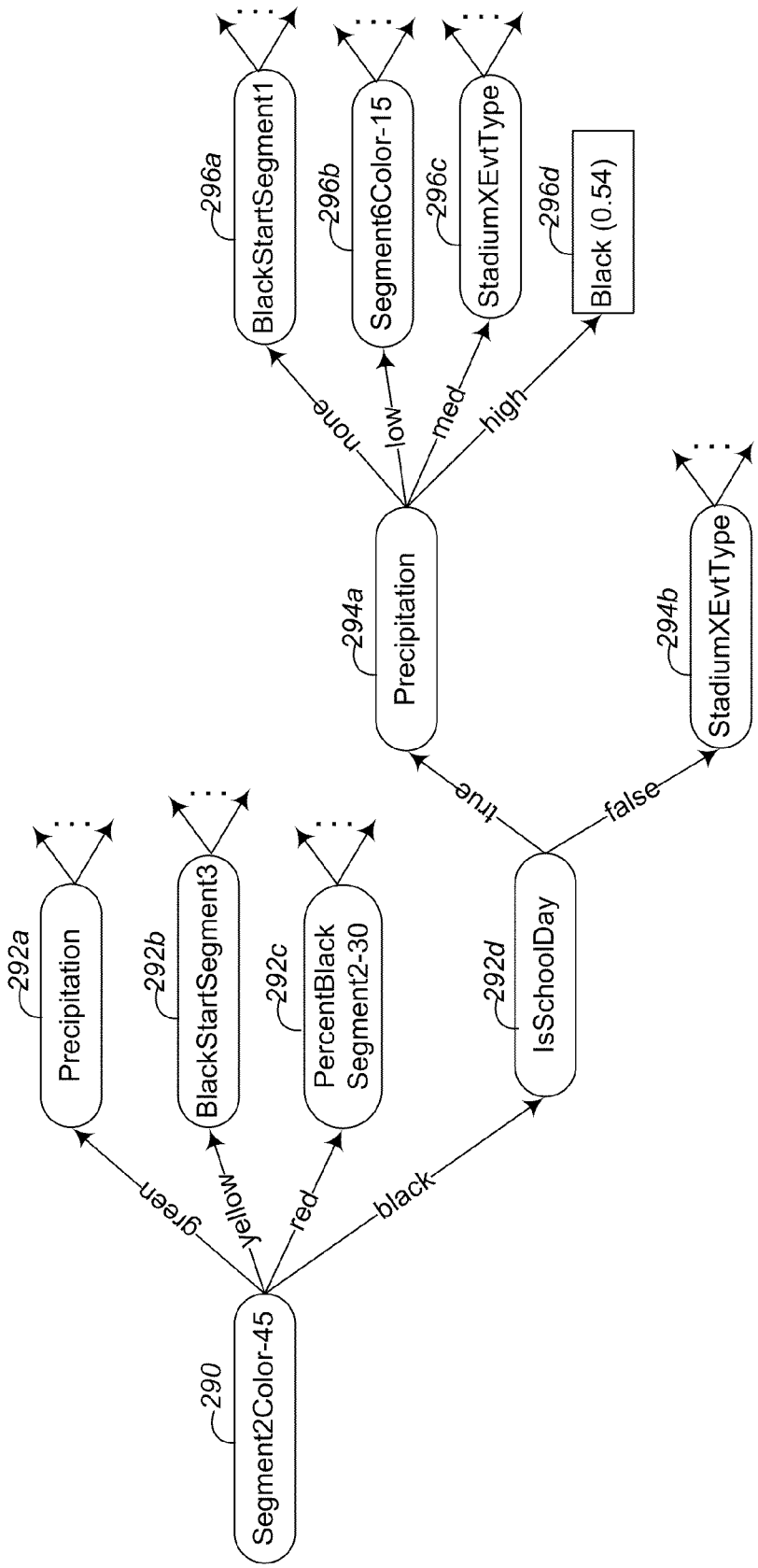

FIG. 2J shows a portion of an updated example decision tree for road segment Segment1 at a future time of 60 minutes, with a particular path illustrated from root node 290 to a leaf node 296*d* that yields a most likely prediction of black traffic congestion level conditions with an associated confidence value of 54%. As described in more detail elsewhere, in some embodiments such decision trees and/or the associated Bayesian network prediction models are updated and/or re-created when new observed case information becomes available. These updates may occur at various times, such as on a periodic basis (e.g., weekly, monthly, etc.), upon request, and/or upon the accumulation of sufficient new observed case data. In addition, in some embodiments the new observed case data may merely be used to update the predicted values for existing leaf nodes (e.g., with respect to histogram 252*f* of FIG. 2F, to update that black is now the most frequent outcome for node 252*e* given the new observed data based on 1284 of 2334 total occurrences), while in other embodiments the new observed case data is used to generate new decision trees with potentially different structures. In this example, the new decision tree depicted in FIG. 2J differs in structure from that shown in FIG. 2H, even though both decision trees predict future traffic congestions levels for road segment Segment1 at a future time of 60 minutes, based on the changes in the observed case data.

Figure 3:
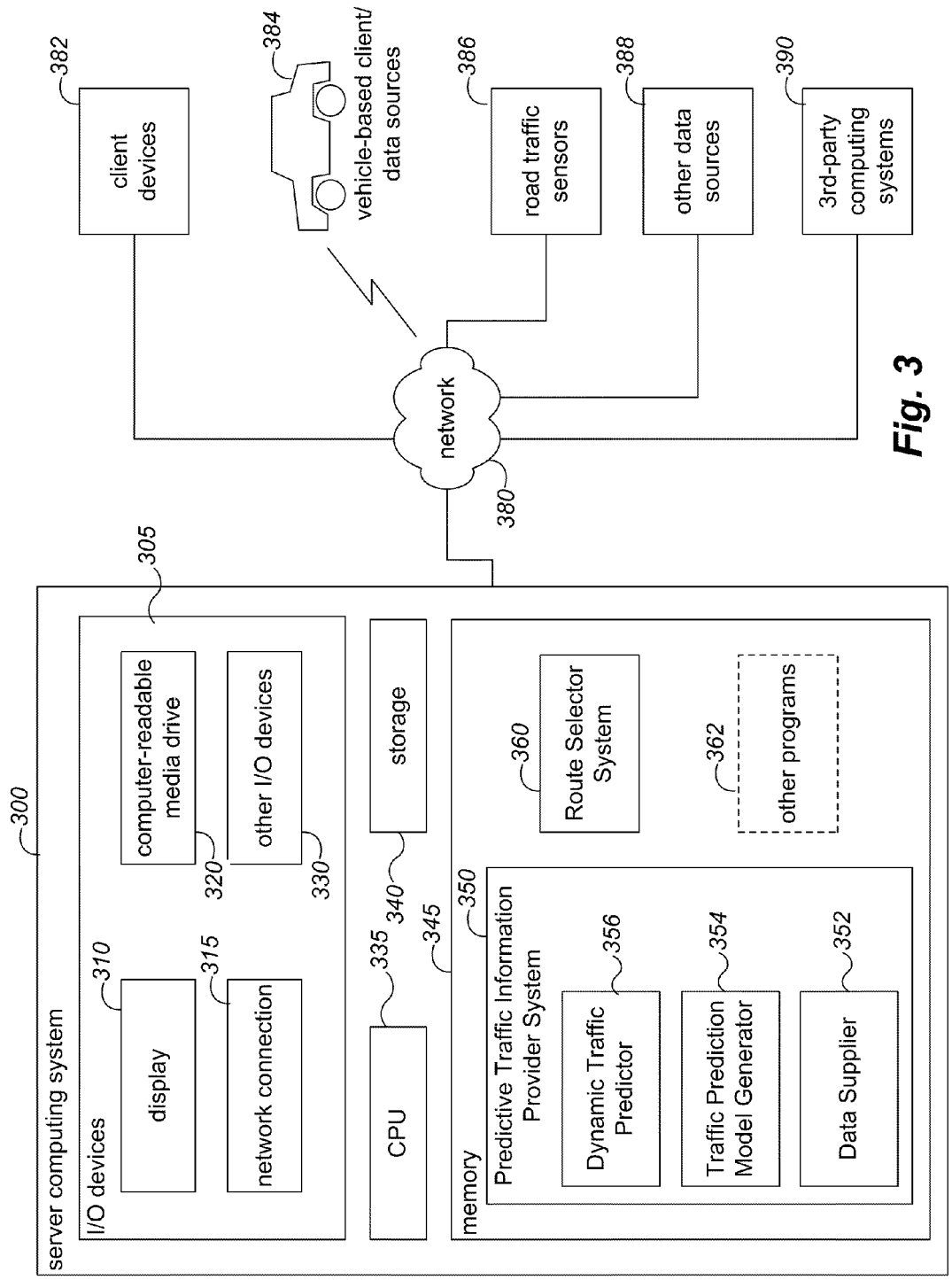
FIG. 3 is a block diagram illustrating a computing system suitable for executing an embodiment of the described Predictive Traffic Information Provider system.

FIG. 3 is a block diagram illustrating an embodiment of a server computing system 300 that is suitable for performing at least some of the described techniques, such as by executing an embodiment of a Predictive Traffic Information Provider and/or a Route Selector system. The server computing system 300 includes a central processing unit ("CPU") 335, various input/output ("I/O") components 305, storage 340, and memory 345, with the illustrated I/O components including a display 310, a network connection 315, a computer-readable media drive 320, and other I/O devices 330 (e.g., keyboards, mice or other pointing devices, microphones, speakers, etc.).

In the illustrated embodiment, a Predictive Traffic Information Provider system 350, a Route Selector system 360 and optional other systems provided by programs 362 are executing in memory 345 in order to perform at least some of the described techniques, with these various executing systems generally referred to herein as predictive traffic information systems. The server computing system and its executing systems may communicate with other computing systems via a network 380 (e.g., the Internet, one or more cellular telephone networks, etc.), such as various client devices 382, vehicle-based clients and/or data sources 384, road traffic sensors 386, other data sources 388, and third-party computing systems 390. In particular, one or more of the predictive traffic information systems receives various information regarding current conditions and/or previous observed case data from various sources, such as from the road traffic sensors, vehicle-based data sources and other data sources. The Predictive Traffic Information Provider system then uses the received data to generate future traffic condition predictions for multiple future times, and provides the predicted information to the Route Selector system and optionally to one or more other recipients, such as one or more predictive traffic information systems, client devices, vehicle-based clients, third-party computing systems, and/or users. The Route Selector system uses the received predicted future traffic condition information to generate route-related information, such as for frequently used routes and/or upon request for indicated routes, and similarly provides such route-related information to one or more other predictive traffic information systems, client devices, vehicle-based clients, and/or third-party computing systems.

The client devices 382 may take various forms in various embodiments, and may generally include any communication devices and other computing devices capable of making requests to and/or receiving information from the predictive traffic information systems. In some cases, the client devices may run interactive console applications (e.g., Web browsers) that users may utilize to make requests for traffic-related information based on predicted future traffic information, while in other cases at least some such traffic-related information may be automatically sent to the client devices (e.g., as text messages, new Web pages, specialized program data updates, etc.) from one or more of the predictive traffic information systems.

The road traffic sensors 386 include multiple sensors that are installed in, at, or near various streets, highways, or other roadways, such as for one or more geographic areas. These sensors include loop sensors that are capable of measuring the number of vehicles passing above the sensor per unit time, vehicle speed, and/or other data related to traffic flow. In addition, such sensors may include cameras, motion sensors, radar ranging devices, and other types of sensors that are located adjacent to a roadway. The road traffic sensors 386 may periodically or continuously provide measured data via wire-based or wireless-based data link to the Predictive Traffic Information Provider system 350 via the network 380 using one or more data exchange mechanisms (e.g., push, pull, polling, request-response, peer-to-peer, etc.). In addition, while not illustrated here, in some embodiments one or more aggregators of such road traffic sensor information (e.g., a governmental transportation body that operates the sensors) may instead obtain the raw data and make that data available to the predictive traffic information systems (whether in raw form or after it is processed).

The other data sources 388 include a variety of types of other sources of data that may be utilized by one or more of the predictive traffic information systems to make predictions related to traffic flow and/or to make selections of traffic routes. Such data sources include, but are not limited to, sources of current and past weather conditions, short and long term weather forecasts, school schedules and/or calendars, event schedules and/or calendars, traffic incident reports provided by human operators (e.g., first responders, law enforcement personnel, highway crews, news media, travelers, etc.), road work information, holiday schedules, etc.

The vehicle-based clients/data sources 384 in this example may each be a computing system located within a vehicle that provides data to one or more of the predictive traffic information systems and/or that receives data from one or more of those system. In some embodiments, the Predictive Traffic Information Provider system may utilize a distributed network of vehicle-based data sources that provide information related to current traffic conditions for use in traffic prediction. For example, each vehicle may include a GPS ("Global Positioning System") device (e.g., a cellular telephone with GPS capabilities, a stand-alone GPS device, etc.) and/or other geo-location device capable of determining the geographic location, speed, direction, and/or other data related to the vehicle's travel, and one or more devices on the vehicle (whether the geo-location device(s) or a distinct communication device) may from time to time obtain such data and provide it to one or more of the predictive traffic information systems (e.g., by way of a wireless link)—such vehicles may include a distributed network of individual users, fleets of vehicles (e.g., for delivery companies, transportation companies, governmental bodies or agencies, vehicles of a vehicle rental service, etc.), vehicles that belong to commercial networks providing related information (e.g., the OnStar service), a group of vehicles operated in order to obtain such traffic condition information (e.g., by traveling over pre-defined routes, or by traveling over roads as dynamically directed, such as to obtain information about roads of interest), etc. Moreover, while not illustrated here, in at least some embodiments other mobile data sources may similarly provide actual data based on travel on the roads, such as based on computing devices and other mobile devices of users who are traveling on the roads (e.g., users who are operators and/or passengers of vehicles on the roads). In addition, such vehicle-based information may be generated in other manners in other embodiments, such as by cellular telephone networks, other wireless networks (e.g., a network of Wi-Fi hotspots) and/or other external systems (e.g., detectors of vehicle transponders using RFID or other communication techniques, camera systems that can observe and identify license plates and/or users' faces) that can detect and track information about vehicles passing by each of multiple transmitters/receivers in the network. Such generated vehicle-based travel-related information may then be used for a variety of purposes, such as to provide information similar to that of road sensors but for road segments that do not have functioning road sensors (e.g., for roads that lack sensors, such as for geographic areas that do not have networks of road sensors and/or for arterial roads that are not significantly large to have road sensors, for road sensors that are broken, etc.), to verify duplicative information that is received from road sensors or other sources, to identify road sensors that are providing inaccurate data (e.g., due to temporary or ongoing problems), etc. The wireless links may be provided by a variety of technologies known in the art, including satellite uplink, cellular network, WI-FI, packet radio, etc., although in at least some embodiments such information about road traffic conditions may be obtained from mobile devices (whether vehicle-based devices and/or user devices) via physically download when the device reaches an appropriate docking or other connection point (e.g., to download information from a fleet vehicle once it has returned to its primary base of operations or other destination with appropriate equipment to perform the information download). In some cases, various factors may cause it to be advantageous for a mobile device to store multiple data samples that are acquired over a determined period of time (e.g., data samples taken at a pre-determined sampling rate, such as 30 seconds or a minute) and/or until sufficient data samples are available (e.g., based on a total size of the data), and to then transmit the stored data samples together (or an aggregation of those samples) after the period of time—for example, the cost structure of transmitting data from a vehicle-based data source via a particular wireless link (e.g., satellite uplink) may be such that transmissions occur only after determined intervals (e.g., every 15 minutes), one or more of the geo-location and/or communication devices may be configured or designed to transmit at such intervals, an ability of a mobile device to transmit data over a wireless link may be temporarily lost (e.g., such as for a mobile device that typically transmits each data sample individually, such as every 30 seconds or 1 minute, and possibly due to factors such as a lack of wireless coverage in an area of the mobile device, other activities being performed by the mobile device or a user of the device, or a temporary problem with the mobile device or an associated transmitter) such that storage of data samples will allow later transmission or physical download, etc. For example, if a wireless transmission of up to 1000 units of information costs $0.25 cents, and each data sample is 50 units in size, the it may be advantageous to sample every minute and send a data set comprising 20 samples every 20 minutes, rather than sending samples more frequently (e.g., every minute). Moreover, in some embodiments additional information may be generated and provided by a mobile device based on multiple stored data samples. For example, if a particular mobile device is able to acquire only information about a current instant position during each data sample, but is not able to acquire additional related information such as speed and/or direction, such additional related information may be calculated or otherwise determined based on multiple subsequent data samples.

Alternatively, some or all of the vehicle-based clients/data sources 384 may each have a computing system located within a vehicle to obtain information from one or more of the predictive traffic information systems, such as for use by an occupant of the vehicle. For example, the vehicle may contain an in-dash navigation system with an installed Web browser or other console application that a user may utilize to make requests for traffic-related information via a wireless link from the Predictive Traffic Information Provider system or the Route Selector system, or instead such requests may be made from a portable device of a user in the vehicle. In addition, one or more of the predictive traffic information systems may automatically transmit traffic-related information to such a vehicle-based client device (e.g., updated predicted traffic information and/or updated route-related information) based upon the receipt or generation of updated information.

The third-party computing systems 390 include one or more optional computing systems that are operated by parties other than the operator(s) of the predictive traffic information systems, such as parties who receive traffic-related data from one or more of the predictive traffic information systems and who make use of the data in some manner. For example, the third-party computing systems 390 may be systems that receive predicted traffic information from one or more of the predictive traffic information systems, and that provide related information (whether the received information or other information based on the received information) to users or others (e.g., via Web portals or subscription services). Alternatively, the third-party computing systems 390 may be operated by other types of parties, such as media organizations that gather and report predicted traffic condition and route information to their consumers, or online map companies that provide predicted traffic-related information to their users as part of travel-planning services.

In this illustrated embodiment, the Predictive Traffic Information Provider system 350 includes a Data Supplier component 352, a Traffic Prediction Model Generator component 354, and a Dynamic Traffic Predictor component 356. The Data Supplier component obtains current condition data that may be used by one or more of the other components or other predictive traffic information systems, such as from the data sources previously discussed, and makes the information available to the other components and predictive traffic information systems. In some embodiments, the Data Supplier component may optionally aggregate obtained data from a variety of data sources, and may further perform one or more of a variety of activities to prepare data for use, such as to place the data in a uniform format; to detect and possibly correct errors or missing data (e.g., due to sensor outages and/or malfunctions, network outages, data provider outages, etc.); to filter out extraneous data, such as outliers; to discretize continuous data, such as to map real-valued numbers to enumerated possible values; to sub-sample discrete data (e.g., by mapping data in a given range of values to a smaller range of values); to group related data (e.g., a sequence of multiple traffic sensors located along a single segment of road that are aggregated in an indicated manner); etc. Information obtained by the Data Supplier component may be provided to other predictive traffic information systems and components in various ways, such as to notify others when new data is available, to provide the data upon request, and/or to store the data in a manner that is accessible to others (e.g., in one or more databases on storage, not shown).

In the illustrated embodiment, the Traffic Prediction Model Generator component uses obtained observation case data to generate predictive models used to make predictions about traffic conditions, as previously discussed. In some embodiments, the Traffic Prediction Model Generator component utilizes historical observation case data to automatically learn the structure of a Bayesian network for a given group of one or more roads, and further automatically learns multiple decision tree models that each may be used to make predictions of future traffic flow on a particular road segment for a particular future time. The created predictive models may then be provided to other predictive traffic information systems and components in various ways, such as to notify others when the new models are available, to provide the models upon request, and/or to store the models in a manner that is accessible to others (e.g., in one or more databases on storage, not shown).

The Dynamic Traffic Predictor component utilizes the predictive models generated by the Traffic Prediction Model Generator component to generate predictions of future traffic conditions for multiple future times, such as based on real-time and/or other current condition information. Such predictions may be made at various times, such as periodically (e.g., every five or ten minutes), when new and/or anomalous data (e.g., a traffic accident incident report) has been received, upon request, etc. The generated predicted future traffic condition information may then be provided to other predictive traffic information systems and components and/or to others in various ways, such as to notify others when new information is available, to provide the information upon request, and/or to store the information in a manner that is accessible to others (e.g., in one or more databases on storage, not shown).

The Route Selector system selects travel route information based on predicted future traffic condition information, and provides such route information to others in various ways. In some embodiments, the Route Selector system receives a request from a client to provide information related to one or more travel routes between a starting and ending location in a given geographic area at a given date and/or time. In response, the Route Selector system obtains predictions of future road conditions for the specified area during the specified time period from, for example, the Predictive Traffic Information Provider system, and then utilizes the predicted future road condition information to analyze various route options and to select one or more routes based on indicated criteria (e.g., shortest time). The selected route information may then be provided to other predictive traffic information systems and components and/or to others in various ways, such as to notify others when information is available, to provide the information upon request, and/or to store the information in a manner that is accessible to others (e.g., in one or more databases on storage, not shown).

It will be appreciated that the illustrated computing systems are merely illustrative and are not intended to limit the scope of the present invention. Computing system 300 may be connected to other devices that are not illustrated, including through one or more networks such as the Internet or via the Web. More generally, a "client" or "server" computing system or device, or predictive traffic information system and/or component, may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system components may in some embodiments be combined in fewer components or distributed in additional components. Similarly, in some embodiments the functionality of some of the illustrated components may not be provided and/or other additional functionality may be available. Note also that while various items are illustrated as being stored in memory or on storage while being used, these items or portions of them can be transferred between memory and other storage devices for purposes of memory management and/or data integrity. Alternatively, in other embodiments some or all of the software components and/or modules may execute in memory on another device and communicate with the illustrated computing system/device via inter-computer communication. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
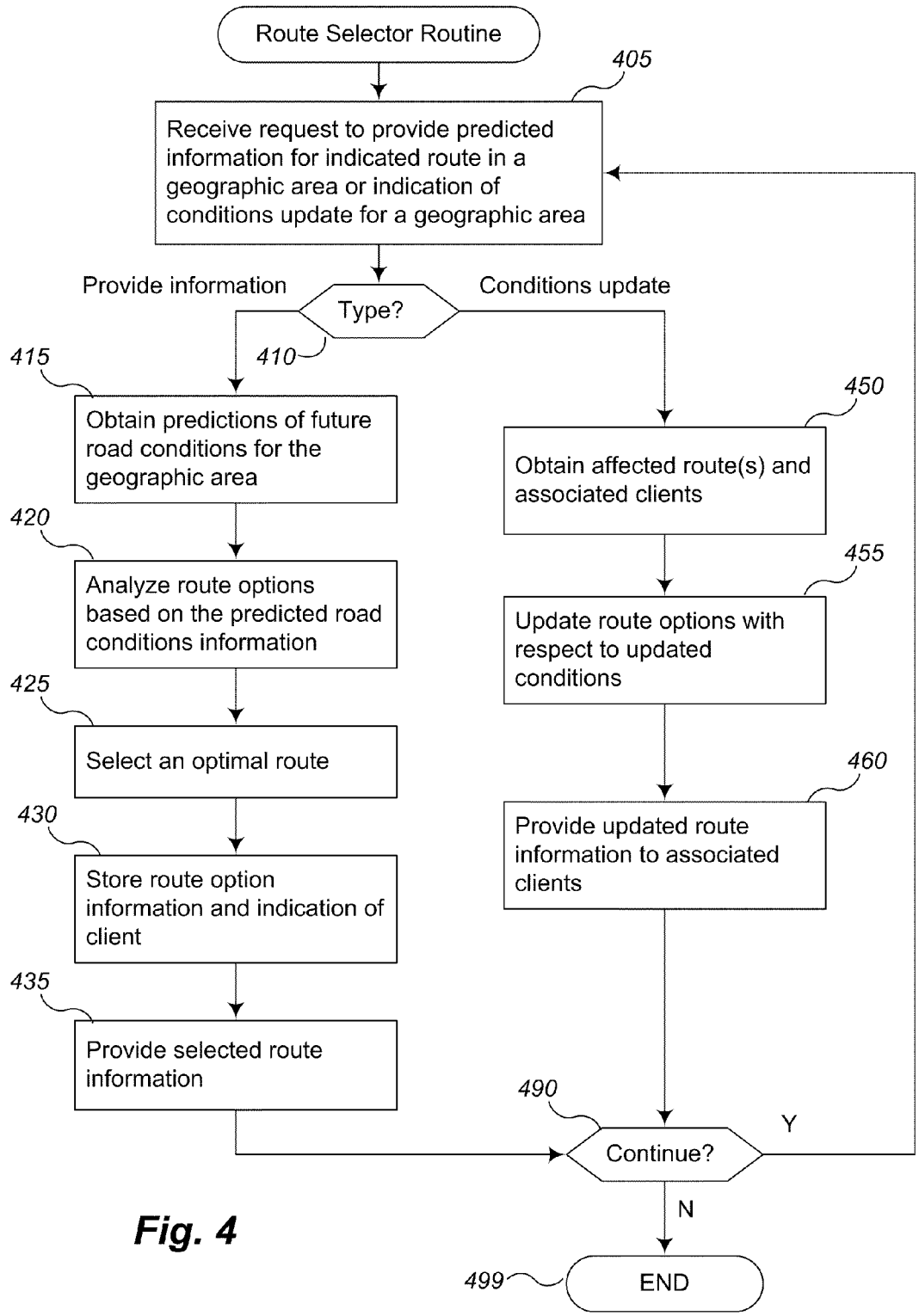
FIG. 4 is a flow diagram of an embodiment of a Route Selector routine.

FIG. 4 is a flow diagram of an embodiment of a Route Selector routine. This routine may be provided, for example, by execution of the Route Selector system 360 of FIG. 3. The routine uses predicted future traffic conditions at multiple future times to plan routes through a network of roads, such as to determine one or more routes that are predicted to be optimal, near-optimal, or otherwise preferred.

The routine begins in step 405 and receives a request to provide predicted information for an indicated route in a geographic area (e.g., a route indicated with a starting location, an ending location, a preferred arrival time, a preferred departure time and/or other indicated criteria for use in identifying or evaluating route options) or receives an indication of an update in relevant conditions for a geographic area. In step 410, the route determines the type of input received, and if a request to provide route information has been received, the routine proceeds to step 415 and obtains predictions of future road conditions at one or more future times for the geographic area, such as for future times that correspond to the preferred travel time (if any). The routine may obtain this information from, for example, the Predictive Traffic Information Provider system 350 described with reference to FIG. 3, such as in an interactive manner or instead by retrieving previously generated prediction information. In step 420, the routine then analyzes route options based on the obtained predicted future road conditions information, such as to determine predicted travel times for each of the route options. The route options may include a number of alternative routes to travel from the indicated starting location (if any) to the indicated ending location (if any), such as a set of pre-determined route options or instead all route options that satisfy indicated criteria (e.g., using roads of a certain size or class, using any roads for which predicted future information is available, using all possible route options, using domain-specific heuristics to constrain the number of possible routes in order to reduce the search space, etc.). In step 425, the routine then optionally selects a predicted optimal route from the set of route options, or in some embodiments more generally ranks the route options (e.g., in a relative or absolute manner) using one or more criteria (e.g., the minimum travel time, minimum travel distance, minimum travel speed, minimum travel speed variability, maximum confidence in a route that otherwise satisfies such criteria, etc. or combinations thereof) and selects some or all of those route options. In step 430, the routine stores the route option information, optionally with an indication of the client that requested the route information (e.g., to enable later provision of updated information to the client should conditions change), and in step 435 provides at least some of the selected route information to the client (e.g., only information for the predicted optimal or top-ranked route, information for a specified number of routes and/or all route options, etc.).

If it is instead decided in step 410 that an indication of a conditions update for a geographic area has been received (e.g., an indication of a traffic incident along a particular roadway), the routine proceeds to step 450 and identifies any affected route(s) whose associated clients are known. In step 455, the routine updates route options with respect to the updated conditions for the identified routes, with the updated conditions possibly including real-time traffic data and/or updated predictions information from the Predictive Traffic Information Provider system, and with the updated route options possibly resulting in a different predicted optimal or top-ranked route option. In step 460, the routine then optionally provides updated route information to the associated clients, such as if the updated route options information would result in different client behavior. For example, the updated route information may be provided to vehicle-based clients that may be traveling on or near the affected routes, or more generally to client devices 382 that had previously been used to obtain information regarding one or more of the affected routes.

After steps 435 or 460, the routine continues to step 490 to determine whether to continue. If so, the routine returns to step 405, and if not continues to step 499 and ends.

Figure 5A:
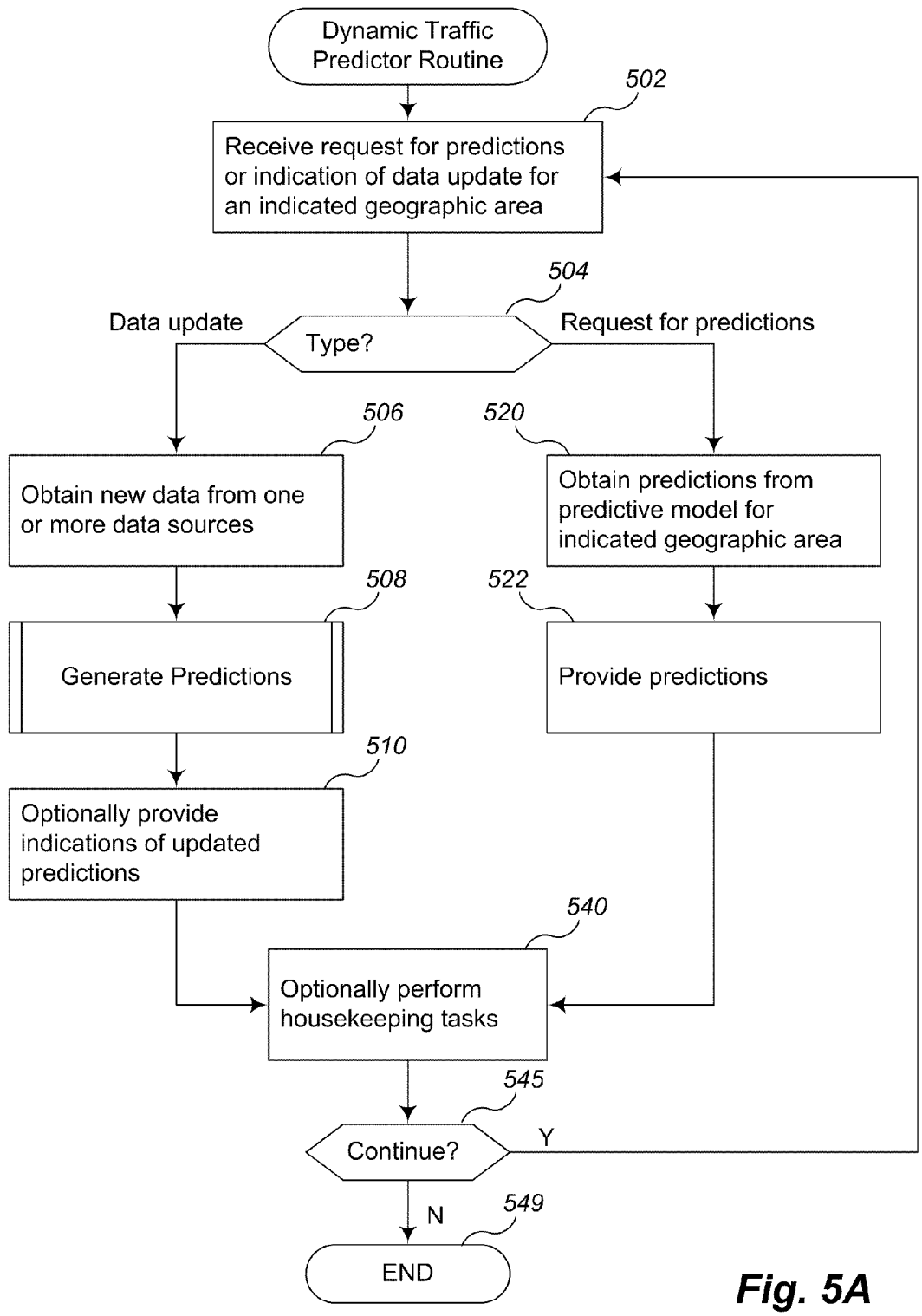
FIGS. 5A-5B are flow diagrams of embodiments of a Dynamic Traffic Predictor routine and an associated Generate Predictions subroutine.
Figure 5B:
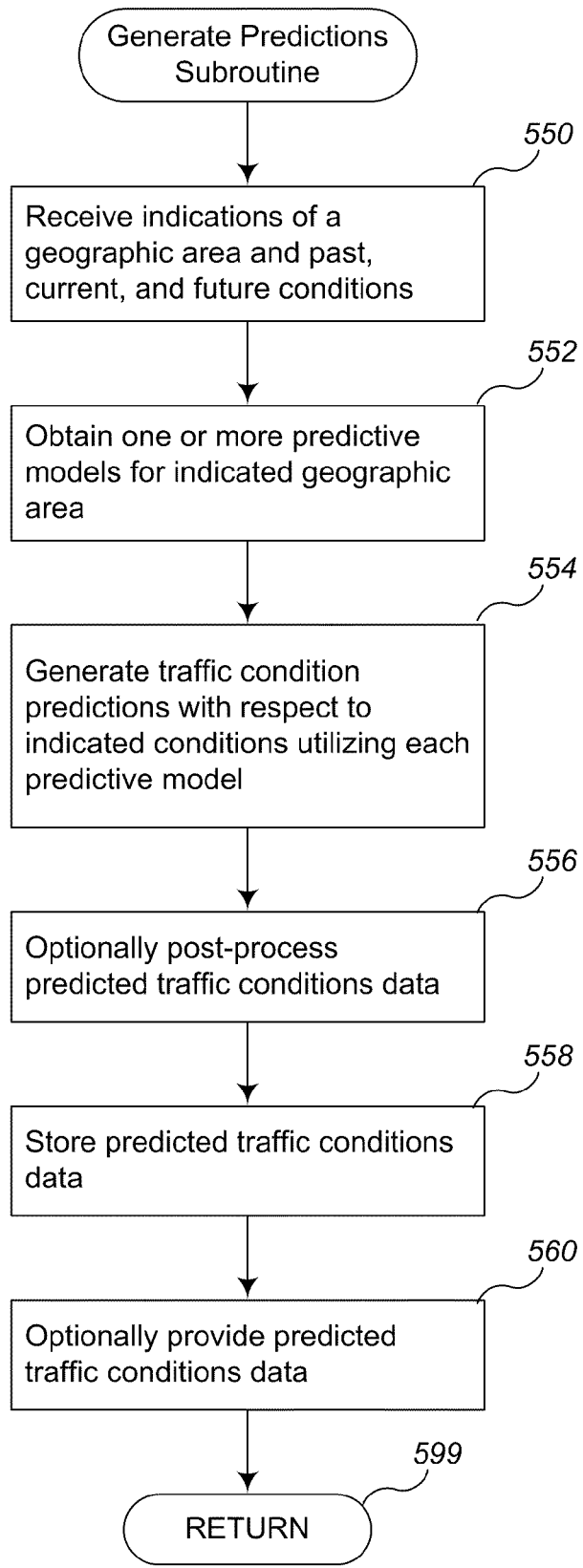

FIGS. 5A-5B are flow diagrams of embodiments of a Dynamic Traffic Predictor routine and an associated Generate Predictions subroutine. The routine of FIG. 5A may be provided, for example, by execution of the Dynamic Traffic Predictor component 356 in FIG. 3, such as to generate predictions of future traffic conditions at multiple future times for each of one or more roads or road segments in one or more geographic areas. In this illustrated embodiment, the routine generates predictions when new current condition input information is received or upon request (e.g., based on periodic requests to generate new predictions, such as every five minutes), but in other embodiments could generate such predictions at other times (e.g., periodically, such as by retrieving any available current condition input information at that time).

The routine begins in step 502 and receives a request for prediction information (e.g., for an indicated road or road segment at an indicated time, or for all roads and road segments in a geographic area based on current conditions) or an indication of a data update for an indicated geographic area. In step 504, the routine determines whether a data update or a predictions request was received, and if it is determined that a data update was received, the routine proceeds to step 506 and obtains new current conditions data from one or more data sources for use as input in the prediction generations (e.g., from the Data Supplier component 352 in FIG. 3, from appropriate stored information, from other sources, etc.). In step 508, the routine executes a Generate Predictions subroutine that generates an updated set of predictions with respect to the newly obtained data, as discussed in greater detail with respect to FIG. 5A, with the generated prediction information stored for later use. In step 510, the routine optionally provides indications of the updated prediction information obtained in step 508 to one or more clients, such as to users who have previously expressed an interest in such information, to third-party entities who may use such prediction information, etc.

If it was instead determined in step 504 that a request for predictions was received, the routine proceeds to step 520 and obtains previously generated predictions from one or more predictive models for the indicated geographic area, such as predictions generated in step 508. In step 522, the routine provides the obtained predictions to the client. After steps 510 and 522, the routine proceeds to step 540 and optionally performs any housekeeping tasks. In step 545, the routine determines whether to continue. If so, the routine returns to step 502, and if not continues to step 549 and ends.

FIG. 5B is a flow diagram of an embodiment of a Generate Predictions subroutine that generates predictions of future traffic conditions at multiple future times for each of one or more roads or road segments in one or more geographic areas, such as for use by the Dynamic Traffic Predictor routine illustrated in FIG. 5A. In this example embodiment, the subroutine generates the future traffic conditions predictions for a geographic area using probabilistic techniques via generated predictive models that include a Bayesian network and multiple corresponding decision trees, such as is previously discussed, but in other embodiments this or a related subroutine could instead generate future traffic conditions predictions in other manners.

The subroutine begins in step 550 and receives indications of a geographic area and of past, current, and future conditions for use as input information. As described in greater detail elsewhere, such conditions may include information about current and past weather conditions, weather forecasts, event schedules, school schedules, current and past traffic conditions, etc. In step 552, the subroutine obtains one or more generated predictive models for the indicated geographic area that include a Bayesian network and one or more decision trees, such as by retrieving previously generated models or by requesting the models from a Traffic Prediction Model Generator component. In step 554, the subroutine generates future traffic condition predictions based on the current conditions input information by using the predictive models, such as to generate predictions at each of multiple future times for each road or road segment in the indicated geographic area. In step 556, the subroutine then optionally performs post-processing of the predicted future traffic conditions information, such as to include merging, averaging, aggregating, selecting, comparing, or otherwise processing one or more sets of output data from the one or more predictive models. In step 558, the subroutine stores the predicted future traffic conditions information, and in step 560 optionally provides the predicted traffic conditions information to one or more clients. In step 599 the subroutine returns.

Figure 6:
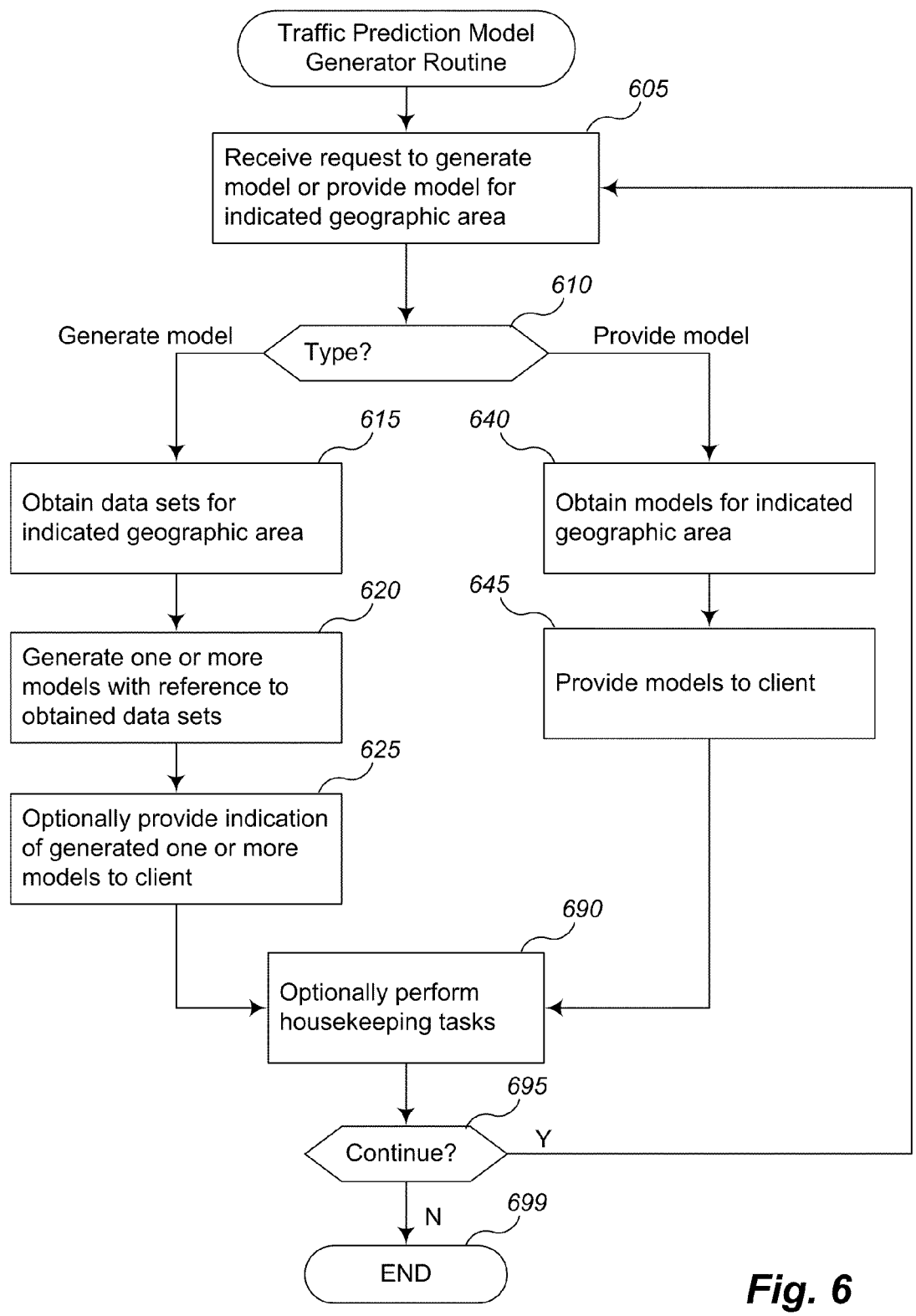
FIG. 6 is a flow diagram of an embodiment of a Traffic Prediction Model Generator routine.

FIG. 6 is a flow diagram of an embodiment of a Traffic Prediction Model Generator routine. The routine may be provided, for example, by execution of the Traffic Prediction Model Generator component 354 of FIG. 3, such as to generate predictive models based on observed case information for later use in generating future traffic conditions predictions.

The routine begins in step 605 and receives a request to generate predictive models for an indicated geographic area or to provide previously generated predictive models for an indicated geographic area. In step 610, the routine determines the type of received request, and if a request to generate a model was received, the routine proceeds to step 615 to obtain observed data for the indicated geographic area, such as from the Data Supplier component 352 or from stored data. In step 620, the routine then generates one or more predictive models with reference to the obtained observed data, as discussed in greater detail elsewhere. In step 625, the routine then optionally provides an indication of the generated one or more models to a client from whom the request was received and/or to others (e.g., the Dynamic Traffic Predictor component 356 of FIG. 3), or otherwise stores the generated models for later use.

If it was instead determined in step 610 that a request to provide a model was received, the routine continues to step 640 where one or more models previously generated predictive models for the indicated geographic area are retrieved. In step 645, the routine then provides those models to the client who requested the models or to another indicated recipient, such as the Dynamic Traffic Predictor component 356 and/or a third-party computing system that utilizes the models to perform its own predictions.

After steps 625 and 645, the routine proceeds to step 690 and optionally performs any housekeeping tasks. In step 695, the routine then determines whether to continue. If so, the routine returns to step 605, and if not continues to step 699 and ends.

In some embodiments, the selection of routes may be based on a variety of types of indicated information, such as when information is requested for fully or partially specified travel routes (with a partially specified route not specifying every road segment between a given starting and ending location), when a starting and ending location are specified (optionally with one or more intermediate locations), when one or more desired times for travel are indicated (e.g., on a particular day; between a first and second time; with an indicated arrival time; etc.); when one or more criteria for assessing route options are specified (e.g., travel time, travel distance, stopping time, speed, etc.), etc. In addition, varying amounts of information related to travel routes may be provided in various embodiments, such as to provide clients with only a predicted optimal selected route or to provide clients with a variety of details about multiple route options analyzed (e.g., in a ranked or otherwise ordered manner, such as by increasing travel time). In addition, some embodiments may represent travel routes in various manners, including human-readable, textual representations using common street and road names and/or machine-readable representations such as series of GPS waypoints.

Various embodiments may also employ various conventions for representing and providing current and predicted traffic condition information. For example, in some embodiments a data feed may be provided for each geographic area of interest to indicate predicted future traffic condition information for each of multiple future times. The data feed format may, for example, be defined by an XML schema that defines an element type with one or more attributes that each contain information related to a predicted traffic congestion level conditions for a single road segment for each of multiple future times, with a fragment of an example such XML stream or file as follows:

<Segment id="423" speed="55" abnormality="0" color="3"
next3 hours="3,3,3,3,2,1,1,0,0,0,1,1"
confidence="2,2,2,1,1,0,0,1,1,1,0,0"/>

The above XML fragment represents the current and predicted future traffic conditions for an example road segment 423 (which may represent a single physical sensor, a group of physical sensors that correspond to a logical road segment, one or more data sources other than traffic sensors, etc.). In this example, the current average speed is indicated to be 55 MPH, no abnormalities exist with respect to the current average speed (in this example, abnormalities indicate a difference in the actual current average speed with respect to what would be expected for the current average speed, such as by using a baseline average speed for that time of day, day of week, week of month, and/or month of year); and the current traffic congestion level is indicated to be 3 (in this example, congestion levels are expressed as integers between 0 and 3, with 3 corresponding to the lowest level of traffic congestion and thus being equivalent to a value of green, and with 0 being equivalent to a value of black). In addition, in this example the comma-delimited list labeled "next3hours" indicates predicted future traffic congestion levels for the next twelve future times at 15 minute intervals. In this example, confidence level information is also provided for each of the twelve predicted future traffic congestion levels, with the comma-delimited list labeled "confidence" indicating such confidence levels, although in other embodiments such confidence levels may not be generated and/or provided. In this example, confidence levels are expressed as integers between 0 and 2, with 2 corresponding to the highest level of confidence and 0 being the lowest level of confidence, although other means of representing predicted future traffic congestion levels and associated confidence levels may be used in other embodiments.

In addition, various embodiments provide various means for users and other clients to interact with one or more of the predictive traffic information systems. For example, some embodiments may provide an interactive console (e.g. a client program providing an interactive user interface, a Web browser-based interface, etc.) from which clients can make requests and receive corresponding responses, such as requests for information related to current and/or predicted traffic conditions and/or requests to analyze, select, and/or provide information related to travel routes. In addition, some embodiments provide an API ("Application Programmer Interface") that allows client computing systems to programmatically make some or all such requests, such as via network message protocols (e.g., Web services) and/or other communication mechanisms.

FIGS. 7A-7I illustrate example displays of various traffic-related information based on predictions of future traffic conditions. In some embodiments, some or all of such traffic-related information may be provided by an embodiment of a Predictive Traffic Information Provider system and/or an embodiment of a Route Selector system, or may instead by provided by one or more third parties based at least in part on predictive traffic information supplied to those third parties by one or more of the system. In addition, such traffic-related information may be provided to users in various ways in various embodiments, such as by a Web-based client on a desktop computing system that displays the information to one or more users or via cellular telephones or other mobile devices that display or otherwise provide the information to a user.

Figure 7A:
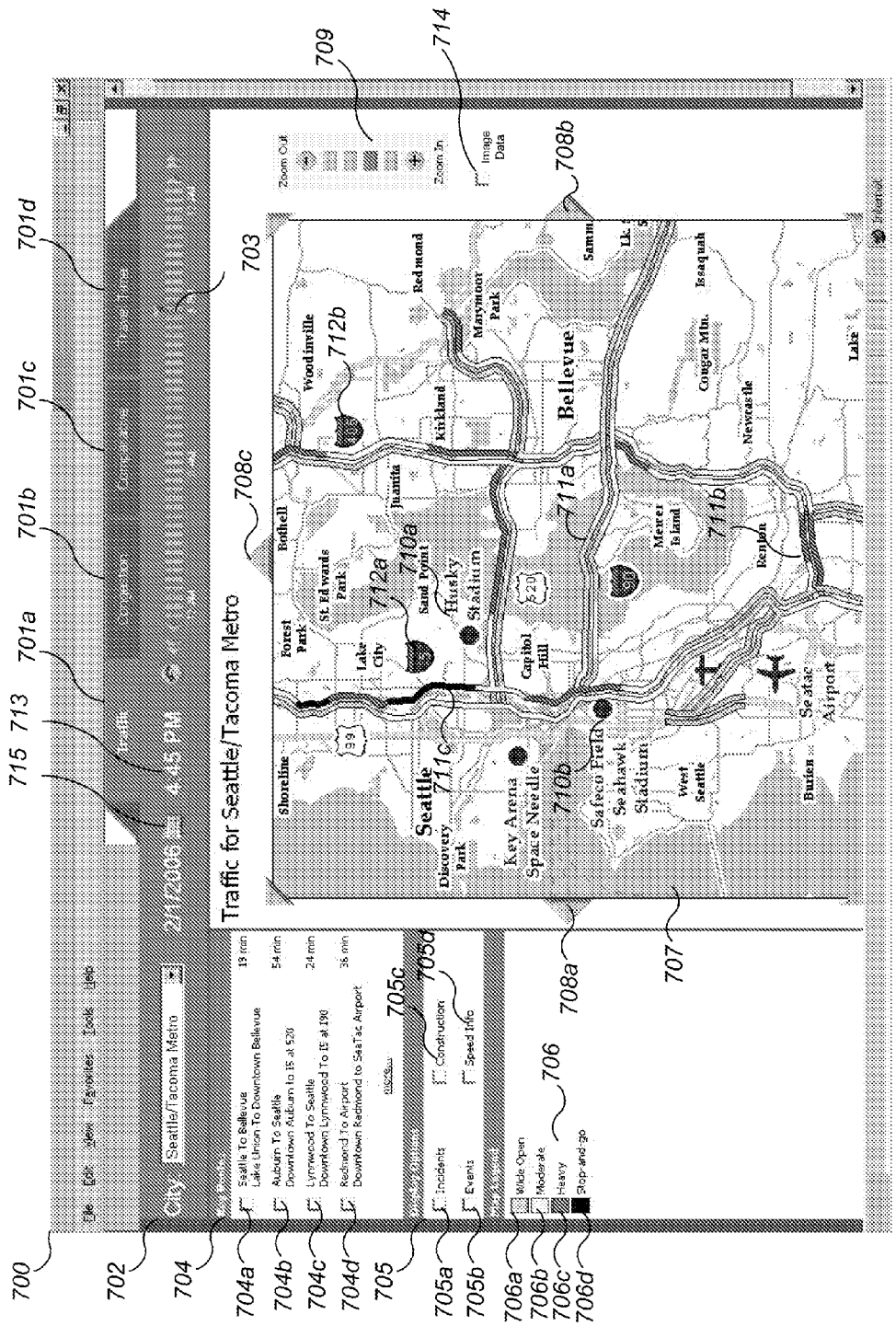

FIG. 7A illustrates an example display 700 showing current traffic conditions for a network of roads in the Seattle/Tacoma Metro geographic area of the state of Washington. In this example, the display includes user-selectable navigation tab controls 701a-d, a user-selectable geographic area selection menu control 702, a user-selectable time slider control 703, a date selector calendar control 715, a key route selection area 704, a display option selection area 705, a map legend area 706, a map display area 707, a user-selectable map data selector control 714, user-selectable pan button controls 708a-c, a user-selectable zoom tool control 709, and currently selected time indicator information 713.

In this example, a view of road traffic information is currently selected (based on selection of the "Traffic" navigation tab 701a), the geographic area currently selected is the Seattle/Tacoma Metro area (via control 702), and the time currently selected is 4:45 PM on Feb. 1 of 2006 (via slider 703 and/or the calendar date selector control 715), with the various displayed information reflecting those selections. As is shown in the map display area 707 and described in the map legend area 706, traffic road congestion level condition information is currently shown for a selection of major roads in the currently visible portion of the Seattle/Tacoma Metro geographic area. For current or past times for which actual road congestion level condition information is available, the displayed information reflects that actual information, and for future times the displayed information reflects predicted future traffic conditions at those times. In this example, the displayed major roads are divided into logical road segments which are each displayed using a level of grayscale shading to indicate a corresponding level of road congestion of that road segment for the selected time, such as with a road segment 711c of the northbound portion of the Interstate 5 road being illustrated with "Stop-and-go" traffic conditions (shown in black in this example), with the adjacent road segment to the south being illustrated with "Moderate" traffic conditions, and with the adjacent road segment to the north also being illustrated with "Stop-and-go" traffic conditions before the next road segment to the north changes to "Heavy" traffic conditions. Road segment 711a along the Interstate 90 road is currently shown with "Wide Open" traffic conditions, road segment 711b along the Interstate 405 road currently is shown with "Heavy" traffic conditions, and numerous other road segments are similarly shown with corresponding traffic congestion level condition information. While illustrated in grayscale here, in other embodiments the map may be displayed instead in color, such as to show "Stop-and-go" traffic conditions in black, "Heavy" traffic conditions in red, "Moderate" traffic conditions in yellow, and "Wide Open" traffic conditions in green.

The display of traffic-related information may be modified by a user (not shown) in various ways in this example embodiment. For example, the geographic area selection menu control 702 can be used to select from one of a number of different geographic areas for which traffic-related information is available. The time slider control 703 can be used to modify the time that is currently selected for which traffic information is shown, such as to view predicted traffic conditions at future times. The key route selection area 704 includes various user-selectable option controls 704a-d that may be selected in order to highlight key routes on the displayed map, such as to highlight a route from Seattle to Bellevue by selecting option 704a. User-selectable display option controls 705a-d include information about incidents 705a, events 705b, construction 705c, and speed info 705d, such as with corresponding information for one or more selected options being overlaid on the displayed map. Pan button controls 708a-c can be used to scroll or pan the map frame 707 to obtain a different view of the current geographic area, with an additional southern pan button control 708d not currently shown due to the scrolling of the window. The zoom tool control 709 may be used to increase or decrease the display scale of the map. The map data selector control 714 may be used to select an alternate source of map data, such as actual satellite or other imagery of the geographic area (e.g., over which labels or other indications of the roads of interest are displayed). Various other user-selectable controls may be provided in other embodiments, and some or all of the illustrated controls may not be available.

In this example, the map currently displays various information in addition to the traffic conditions for the selected network of roads, such as to indicate venues and other locations that may correspond to events and other areas of traffic concentration (such as Husky Stadium 710a in which college football and other events may occur, Safeco Field 710b in which professional baseball and other events may occur, Seahawk Stadium in which professional football and soccer and other events may occur, the Space Needle tourist attraction, the SeaTac Airport, popular parks such as Marymoor Park and Discovery Park, etc.), cities and neighborhoods, and highway labels such as 712a-b. Various other types of information may similarly be shown, such as at all times or instead in a user-selectable manner.

Figure 7B:
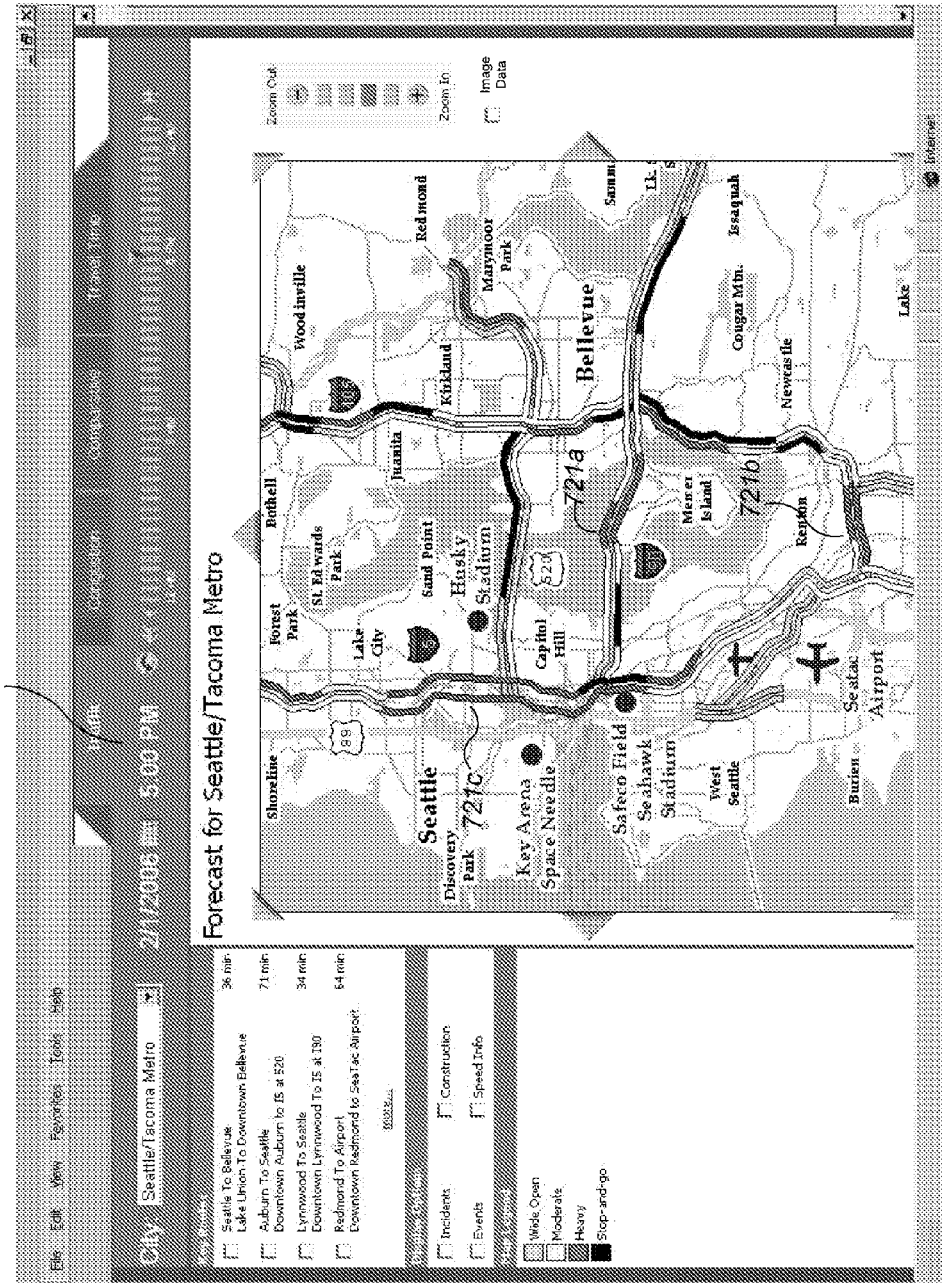

FIG. 7B illustrates an example display showing predicted traffic conditions at a currently selected future time 723 of 5:00 PM, such as based on user modification at 4:45 PM of the slider control 703 of FIG. 7A. Overall, the illustrated predicted traffic congestion level conditions in FIG. 7B for the road network appear to be more congested than the traffic congestion level conditions for 4:45 PM in FIG. 7A. As one example, road segment 721a has a different predicted level of road traffic congestion condition than the respective corresponding road segment 711a of FIG. 7A, with heavy traffic congestion conditions now being illustrated.

Figure 7C:
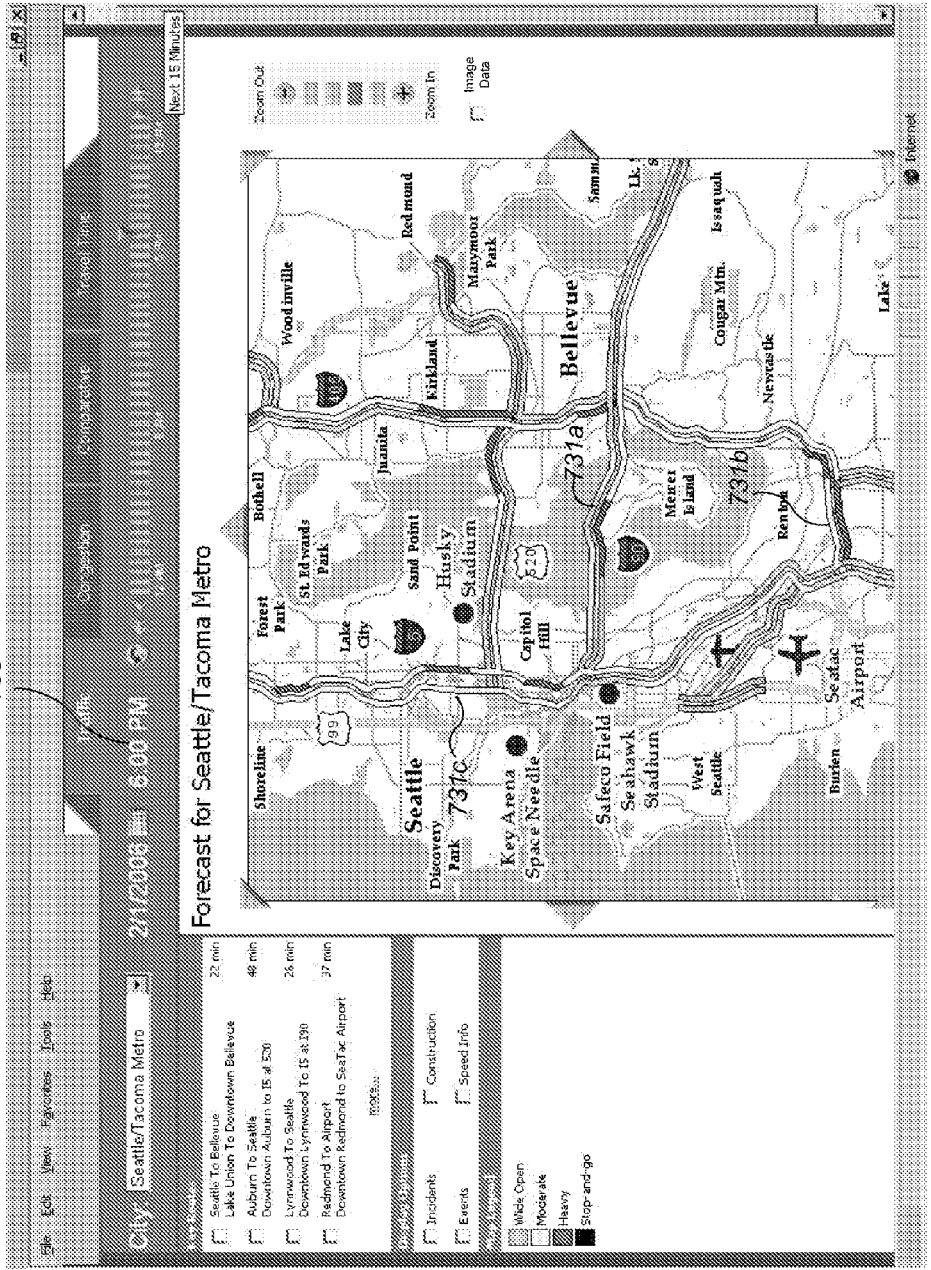

FIG. 7C illustrates an example display showing predicted traffic conditions at a currently selected future time 733 of 6:00 PM, such as based on user modification at 4:45 PM of the slider control 703 of FIG. 7A. Overall, the illustrated predicted traffic congestion level conditions in FIG. 7C for the road network appear to be less congested than the predicted traffic congestion level conditions for 5:00 PM in FIG. 7B. For example, road segment 731a is shown as being wide open at 6 PM, while traffic for the same segment 721a in FIG. 7B was predicted to be heavy at 5:00 PM. In addition, road segment 731b has changed from heavy to moderate levels of traffic congestion between 5:00 and 6:00 PM, as shown by the corresponding segment 721b in FIG. 7B.

Figure 7D:
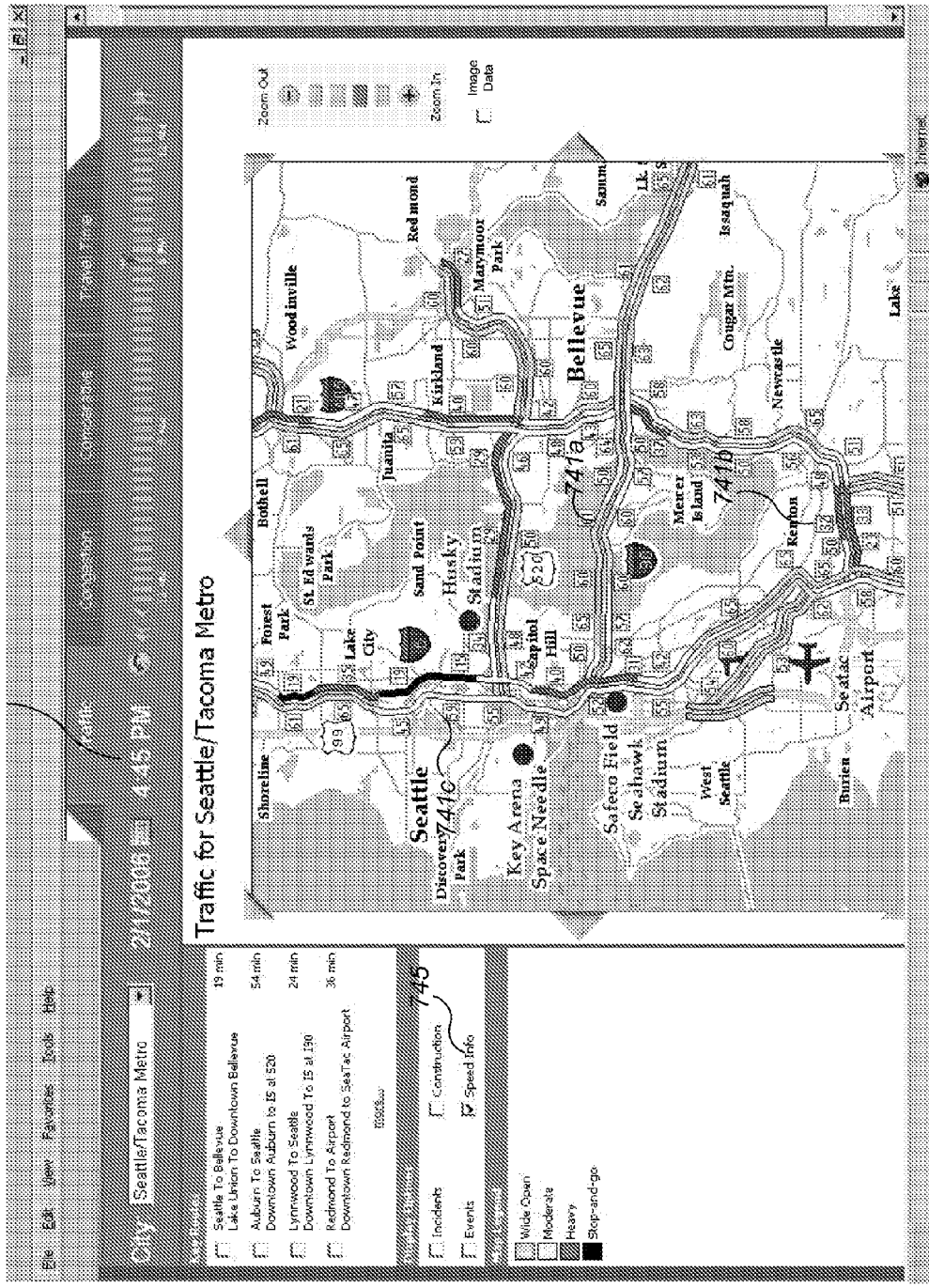

FIG. 7D illustrates an example display similar to that shown in FIG. 7A, but with the map being augmented with roadway speed information. In particular, in this view the user has selected the display option 745 (labeled "Speed Info") in order to cause current average traffic speeds to be illustrated. For example, road segment 741a (with wide open traffic congestion) is labeled with a numeric 61 indicator that reflects an average speed of 61 miles per hour for traffic on that segment at the currently selected time 743 of 4:45 PM. In contrast, road segment 741b (with heavy traffic congestion) is labeled with a numeric 32 indicator that reflects an average speed of only 32 miles per hour for vehicles on that road segment. In some embodiments such speed information indicators may be displayed for only current and/or past times, while in other embodiments predicted future traffic condition speed information may similarly be displayed for future times.

Figure 7E:
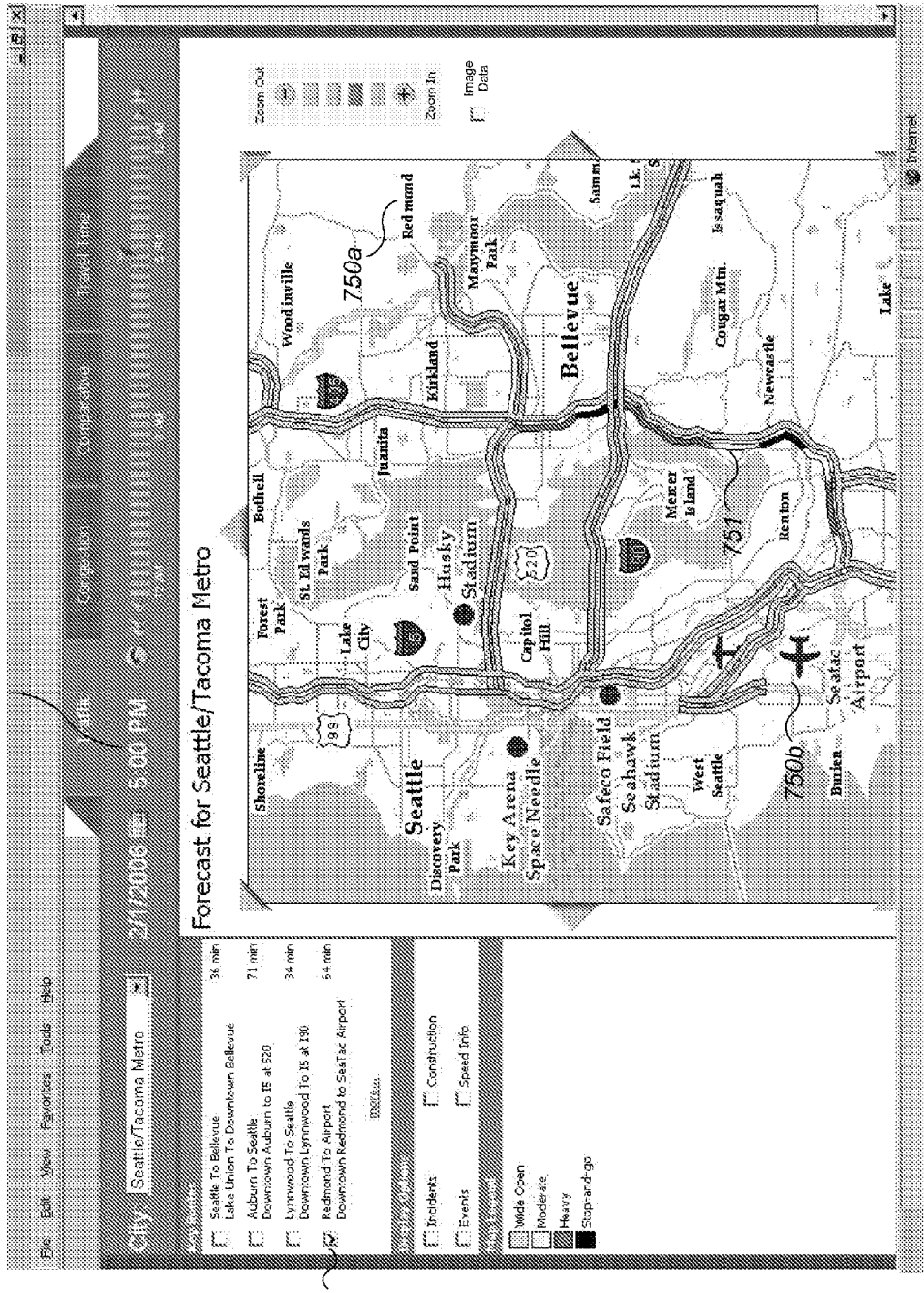

FIG. 7E illustrates an example display similar to that shown in FIG. 7B, but with the map showing predicted travel conditions on a particular travel route at the currently selected future time 753 of 5:00 PM. In this example, the user has selected key route option control 752 labeled "Redmond to Airport," and in response information about predicted traffic conditions relevant to the route between Redmond 750a and SeaTac Airport 750b are shown for the currently selected future time. In particular, in this example traffic condition information is shown only for the route 751 through the road network corresponding to the selected route option 752, such as by displaying other roads in a de-emphasized fashion (e.g., in embodiments in which road congestion levels are shown in color, by showing the other roads in gray).

Figure 7F:
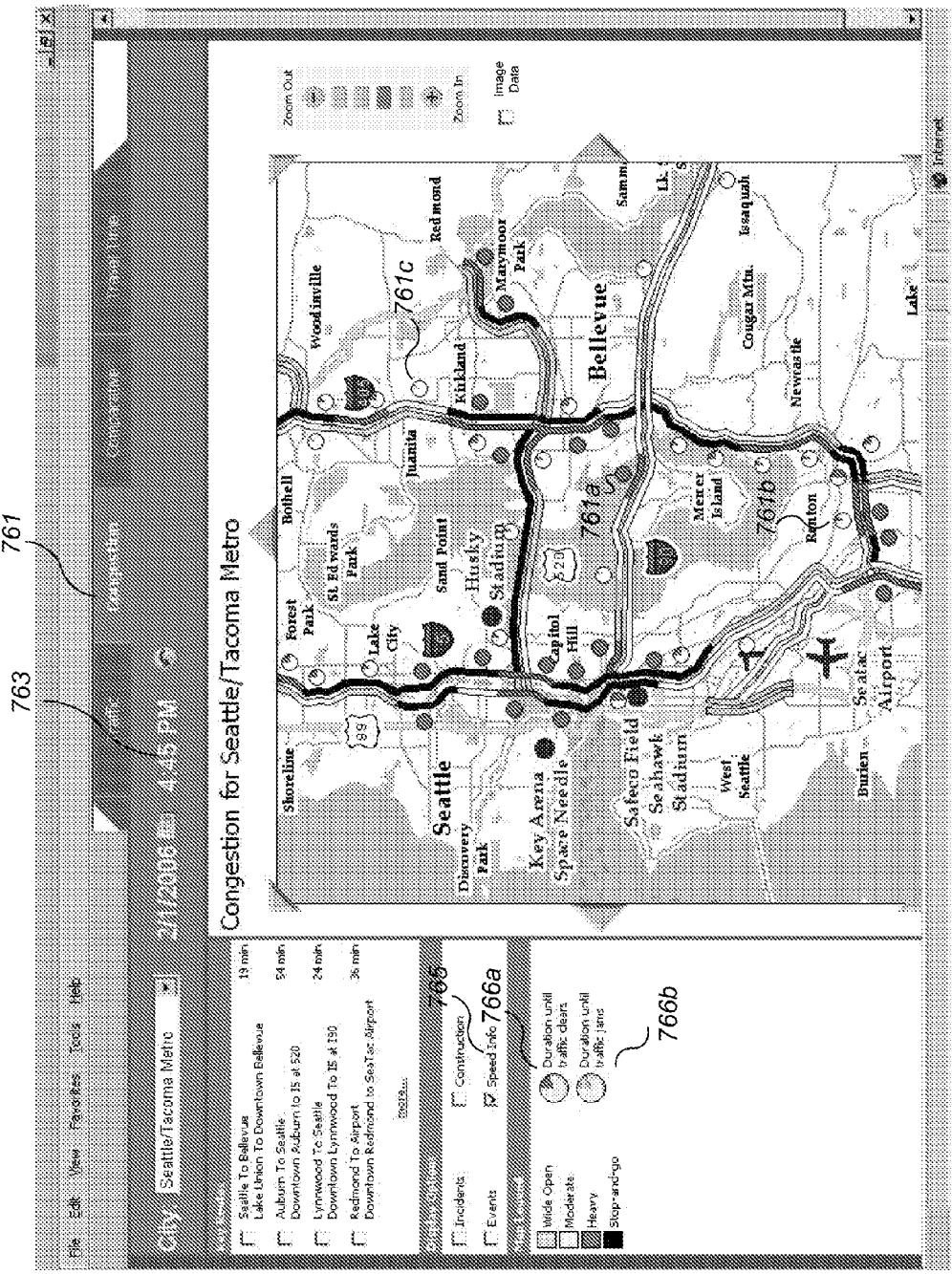

FIG. 7F illustrates an example display similar to that shown in FIG. 7A, but with the map showing a congestion-oriented view of current traffic conditions at the currently selected time 763 of 4:45 PM. In this view, the user has selected the "Congestion" navigation tab control 761 and the speed information display option 765 in order to obtain information about predicted times until current traffic conditions are expected to change from their current state. In this example, a time slider is not shown because the predicted information provided is relative to a current time of 4:45 PM, although in other embodiments similar predicted change information may additionally be available for user-selected future times. In this view, road segments are annotated with circular clock icons, such as icons 766a and 766b. The clock icon 766a with darker shading in this example indicates an amount of time until traffic on a given road segment clears or otherwise improves by a designated amount (e.g., changes from "Stop-and-go" or "Heavy" to "Moderate" or "Wide Open"), while the clock icon 766b with lighter shading in this example indicates an amount of time until traffic on a given road segment becomes congested or otherwise worsens by a designated amount (e.g., changes from "Wide Open" or "Moderate" to "Heavy" or "Stop-and-go"). For example, clock icon 761a is all dark, indicating that the corresponding adjoining road segment is expected to remain in a congested state for at least the next hour. In contrast, clock icon 761b is only approximately one-eighth dark, indicating that the adjoining road segment is expected to clear in approximately one-eighth of an hour, and clock icon 761c is approximately one-eighth light, indicating that traffic on the adjoining road segment is expected to become congested soon.

FIG. 7I illustrates an example display similar to that shown in FIG. 7F, but with only a portion of one road illustrated and with icons that each visual present information about predicted traffic conditions for multiple future times. In this example, three road segments 790a-c are shown and each displayed with a degree of predicted traffic congestion level at a particular currently selected time, not shown (although in embodiments in which the currently selected time is a past time, at least some of the information displayed may reflect actual traffic congestion levels corresponding to the past time rather than predicted information). In this example, road segment 790a has wide-open traffic conditions at the currently selected time, road segment 790b has moderate traffic conditions at the currently selected time, and road segment 790c has heavy traffic conditions at the currently selected time.

In addition, each road segment has an adjoining clock icon that can display multiple areas each corresponding to a portion of the hour following the currently selected time, although in other embodiments the clock may represent a period of time other than an hour, or such information may alternatively be displayed in manners other than a clock or a circle. For example, clock 791 adjoins road segment 790a and has four portions 791a-d, with each portion for this clock being a 15-minute quadrant, and with each clock portion being filled with the level of grayscale for the traffic congestion level represented by that portion. Thus, portion 791a represents the 15 minutes following the currently selected time and is shaded to indicate that wide-open traffic conditions are predicted for road segment 790a during those 15 minutes, and portion 791b represents the period of time from 15 to 30 minutes after the currently selected time and also indicates predicted wide-open traffic congestion level conditions. While the portions of example clock 791 are evenly spaced in 15-minute segments (e.g., to reflect predictions made at each of 15-minute time intervals), in other embodiments each distinct portion of time within a clock may instead correspond to a different predicted or actual traffic congestion level—if so, the two portions 791a and 791b that both represent the same level of traffic congestion would instead by combined into a single portion, which in this example would be a portion that fills the first half of the clock. In this example, portion 791c indicates predicted moderate traffic conditions for the road segment during the next period of time (which in this example is 30 to 45 minutes after the currently selected time), and portion 791d indicates predicted heavy traffic conditions for the road segment during the last 15 minutes of the hour. Thus, in contrast to the clock icons illustrated in FIG. 7F that each represent a single predicted future traffic condition (the future point in time when the level of traffic congestion will change), the clock icon 791 illustrates predicted future traffic conditions for each of multiple future times, and provides significantly more information to the user regarding predicted future conditions in a compact and easy-to-understand manner.

In a similar manner to clock icon 791, clock icon 792 adjoins road segment 790b and has four portions 792a-d that in this example are each 15-minute quadrants. Quadrants 792a-d represent, respectively, moderate, heavy, heavy, and stop-and-go predicted traffic congestion level conditions for road segment 790b at the periods of time corresponding to the portions. Conversely, clock icon 793 has only three portions that each represent a traffic congestion level distinct from any other portions adjacent in time. Thus, with respect to adjoining road segment 790c, portion 793a of clock 793 indicates predicted heavy traffic congestion level conditions for the road segment during a first approximately 7 minutes following the currently selected time, portion 793b indicates predicted moderate traffic congestion level conditions for the road segment during the following approximately 15 minutes, and portion 793c indicates predicted wide open traffic congestion level conditions for the road segment during the remainder of the hour. While three portions of time are illustrated here, in will be appreciated that more or less portions could be displayed, that each portion can represent any amount of time down to the difference in times between distinct future time predictions, and that different portions of such a clock may represent the same predicted level of traffic congestion (e.g., if one or more intervening portions have one or more different predicted traffic congestion levels).

Figure 7G:
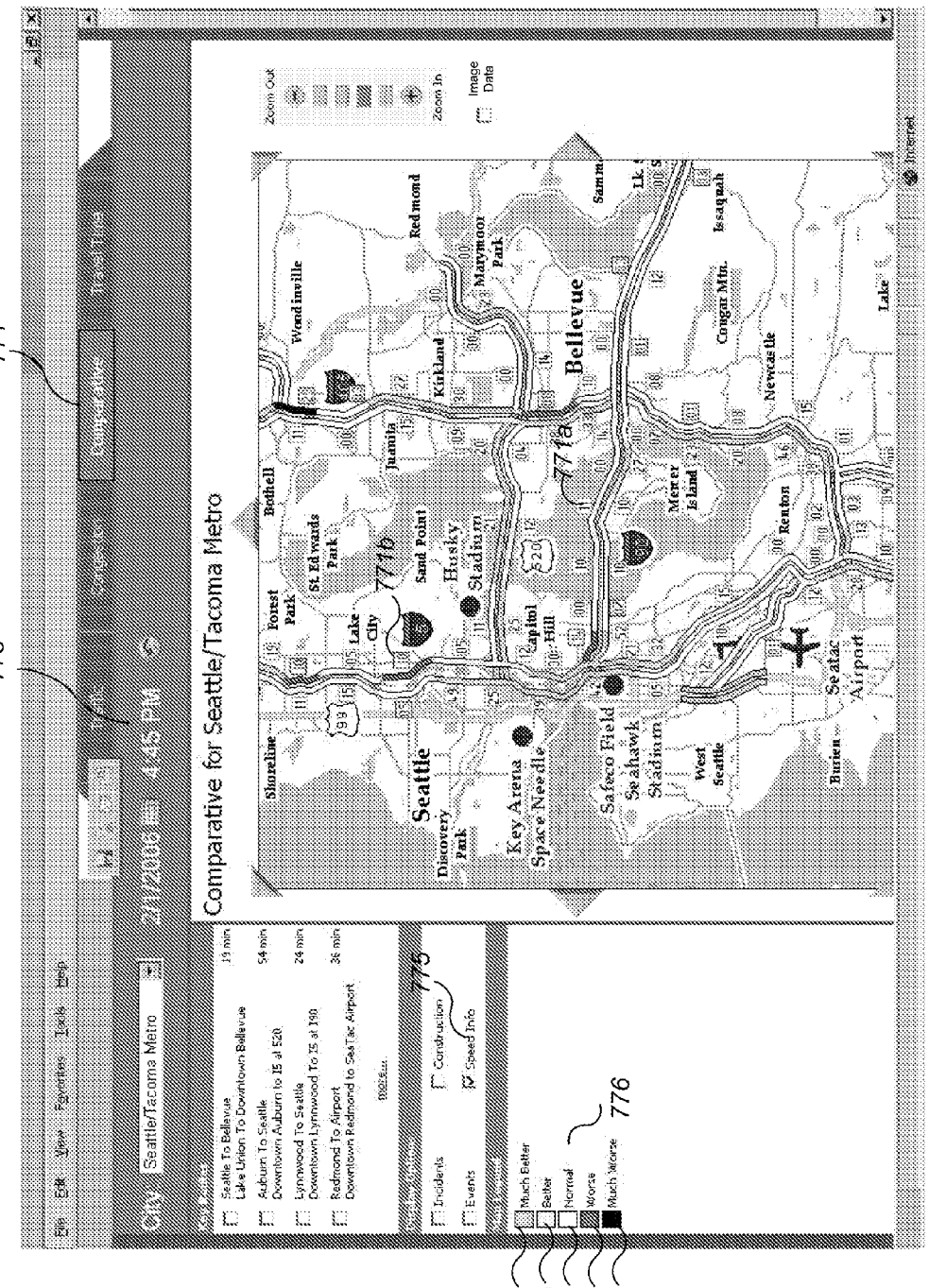

FIG. 7G illustrates an example display similar to that shown in FIG. 7A, but with the map showing a comparative view of current traffic conditions at the currently selected time 773 of 4:45 PM so as to indicate differences from normal conditions. In this view, the user has selected the "Comparative" navigation tab control 771 and the speed information display option control 775 in order to obtain information describing a degree of difference between current traffic conditions as compared to normal, with normal traffic conditions being determined in this example by reference to a predictive model that can be used to determine expected long-term traffic condition forecasts based on historical observations and some current conditions such as scheduled events but not on transient or temporary situations such as accidents and other road incidents, short-term road construction, weather, etc. More generally, in other embodiments the "normal" data against which the comparison is made may be determined or selected in other manners, such as by purely using historical averages, by allowing a user to designate the types of information to be considered for the "normal" data (e.g., to use school calendar information but not events), by allowing a user or other operator to designate a particular set of data to be used for the comparison (e.g., by supplying a particular set of data, by indicating a particular past date to use, such as last Wednesday at 5 PM, etc.), etc. In this example, a time slider is not shown because the predicted information provided is relative to a current time of 4:45 PM, although in other embodiments similar predicted difference information may additionally be available for user-selected future times. In this view, the road segments are again marked to reflect information of interest, but the map legend 776 indicates different meanings for the markings, such as to indicate varying degrees of difference from normal in various shades of gray (or in other embodiments to instead using various colors, such as green to indicate that current or predicted traffic conditions are much better than normal 776a, yellow to indicate that the traffic conditions are better than normal 776b, white to indicate that the traffic conditions are substantially normal 776c, red to indicate that the traffic conditions are worse than normal 776d, and black to indicate that the traffic conditions are much worse than normal 776e). In addition, in this example the selection of the speed information control 775 prompts road segments to be annotated with numbers in boxes to indicate the number of miles per hour faster or slower than normal that traffic is flowing on a given road segment (e.g., for embodiments in which colors are used, boxes displayed in one of two colors to indicate better than normal speeds and worse than normal speeds, such as green for better and red for worse). For example, road segment 771a is displayed with a level of grayscale indicating better-than-normal traffic and is annotated with the number "11" in a box (e.g., a green box) to indicate that traffic is flowing 11 miles per hour faster than normal on that road segment. In contrast, road segment 771b is displayed with a level of grayscale indicating worse-than-normal traffic and is annotated with the number "10" in a box (e.g., a red box) to indicate that traffic is flowing 10 miles per hour slower than normal on that road segment.

Figure 7H:
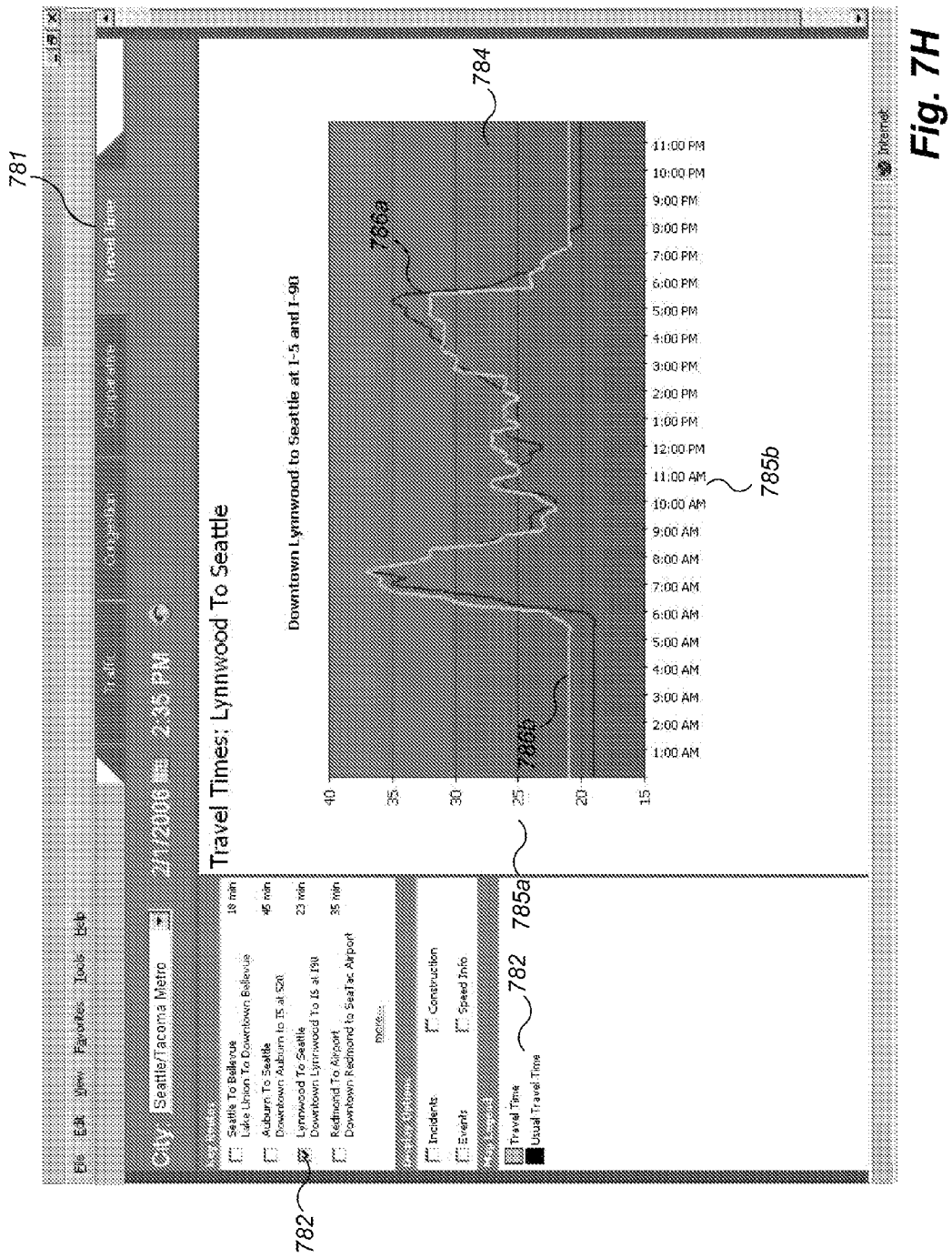

FIG. 7H illustrates an example display similar to that shown in FIG. 7A, but with the map showing a graphical view of total travel time for a particular travel route over the course of a day based on the currently selected day of Feb. 1, 2006. In this view, the user has selected the "Travel Time" navigation tab 781 in order to obtain the usual and actual/expected total travel times for a selected route, such as a route between Lynnwood and Seattle based on selection of the Lynnwood to Seattle route option control 782. In particular, a graph 784 is displayed that plots time of day on the x-axis 785b and total travel time in minutes on the y-axis 785a. The dark line 786a graphs the usual total travel time for the given travel route at the various times during the day, and the light line 786b graphs the current and/or predicted travel times (based on whether the currently selected day is in the past, is today, or is in the future), thus enabling easy comparison of the differences in the total travel time lines. As with respect to FIG. 7G, the usual total travel times for a route in FIG. 7H may be determined in various ways in various embodiments, including based on historical averages, by reference to a predictive model that can be used to determine expected long-term traffic condition forecasts based on historical observations and some current conditions (such as scheduled events) but not on transient or temporary situations (such as accidents and other road incidents, short-term road construction, etc.), by allowing a user to designate the types of information to be considered for the "usual" data (e.g., to use school calendar information but not events), by allowing a user or other operator to designate a particular set of data to be used for the comparison (e.g., by supplying a particular set of data, by indicating a particular past date to use, such as last Wednesday at 5 PM, etc.), etc. In addition, a time slider is not shown in this example because the predicted information provided is relative to the day of a currently selected time, although in other embodiments similar predicted difference information may be available for user-selected future times via a slider or other mechanism to select a date.

Various embodiments may further utilize various input information and provide various output information for the predictive models used to make future traffic conditions predictions. In some embodiments, inputs to the predictive models related to date and time information include the following variables: MarketId (an identifier for a geographic region); DateTimeUtc (the time of day in Universal Time); DateTimeLocal (the time of day in local time); DateTimeKey, DateDayOfWeekLocal (the day of the week); DateMonthLocal (the month of the year); DateDayLocal; DateHourLocal (the hour of the day); DatePeriod15MinutesLocal (the 15 minute interval of the day); and HolidayLocal (whether the day is a holiday). In some embodiments, inputs to the predictive models related to current and past traffic conditions information include the following variables: RoadSegmentId (an identifier for a particular road segment); SpeedX (the current reported speed of traffic on road segment X); BlackStartLocalX (the length of time that black traffic congestion level conditions have been reported for road segment X); PercentBlackX (the percentage of sensors or other data sources associated with road segment X that are reporting black traffic congestion level conditions); PercentBlackX-N, where X is a particular road segment and N is a member of {15, 30, 45, 60} and where the value corresponds to the percentage of a road segment X (e.g., percent of sensors associated with the road segment) for which black traffic conditions were reported N minutes ago; RawColorX (the current color corresponding to a level of traffic congestion on road segment X); RawColorX-N, where X is a particular road segment and N is a member of {15, 30, 45, 60}, and where the value is a color corresponding to a level of traffic congestion on road segment X N minutes ago; SinceBlackX (the length of time since black traffic congestion levels have been reported for road segment X); HealthX; and AbnormalityX. In some embodiments, inputs to the predictive models related to weather conditions information include the following variables: Temperature (current temperature); WindDirection (current wind direction); WindSpeed (current wind speed); SkyCover (current level of cloud or haze); PresentWeather (current weather state); and RainNHour, where N is a member of {1, 3, 6, 24} and represents precipitation accumulation in the previous N hour(s); and MetarId. In some embodiments, inputs to the predictive models related to event and school schedules information include the following variables: EventVenueId (a venue identifier); EventScheduleId (a schedule identifier); DateDayLocal (the day of a given event); StartHourLocal (the start hour of a given event); EventTypeId (an event type identifier); EventVenueId (a venue identifier); SchoolLocationId (a school location identifier); and IsSchoolDay (whether or not the current day is a school day).

In some embodiments, outputs to the predictive models related to traffic conditions include the following variables: RawColorXN, where X is a particular road segment and N is a member of {15, 30, 45, 60, 75, 90, 105, 120, 135, 150, 165, 180}, and where the value is a color corresponding to an expected level of traffic congestion on road segment X in N minutes time; and PredRawColorXNProb to indicate confidence in given predictions, where X and N are defined as above with reference to the RawColorXN variables and the value is the confidence level in prediction for road segment X in N minutes time (e.g., based on the level of historical support from observed data for the decision tree path taken to make the prediction).

The following illustrates one example of possible values or ranges of values that may be taken by various of the variables described above, with the indicator " . . . " between two numbers indicating that any integer between and including those two numbers are possible values (e.g., "1 . . . 4" represents {1, 2, 3, 4}), and with possible values of 0 and 1 indicating true and false for appropriate variables (e.g., casedata.HolidayLocal). In other embodiments, other input and/or output variables may be used, and their values may be represented in other manners.

| Variable Name | Example Possible Values |
| --- | --- |
| eventschedule.EventScheduleId | Integer |
| eventschedule.EventVenueId | Integer |
| eventschedule.Name | "Seattle Mariners Game" |
| eventschedule.DateDayLocal | 1 . . . 31 |
| eventschedule.StartHourLocal | 0 . . . 23 |
| eventschedule.EventTypeId | Integer |
| eventvenue.EventVenueId | Integer |
| eventvenue.Name | "Safeco Field" |
| eventvenue.MarketId | Integer |
| casedata.DateTimeUtc | 02/13/2006 12:15:00 |
| casedata.DateTimeLocal | 02/13/2006 04:15:00 |
| casedata.DateDayOfWeekLocal | 1 . . . 7 |
| casedata.DateMonthLocal | 1 . . . 12 |
| casedata.DateHourLocal | 0 . . . 23 |
| casedata.HolidayLocal | 0, 1 |
| roadsegmentdata.RoadSegmentId | Integer |
| roadsegmentdata.SpeedX | 0 . . . 100 (mph) |
| roadsegmentdata.BlackStartLocalX | Before 0745, 0745-0759, 0800-0814, 0815-0829, 0830-0844, 0845-0859, . . ., 1915-1929, After 1930 |
| roadsegmentdata.SinceBlackX | Integer (minutes) |
| roadsegmentdata.PercentBlackX | none, 0-15, 15-30, 30-50, 50-75, 75-100 |
| roadsegmentdata.PercentBlackX-N | none, 0-15, 15-30, 30-50, 50-75, 75-100 |
| roadsegmentdata.RawColorX | 0, 1, 2, 3 |
| roadsegmentdata.RawColorXN | 0, 1, 2, 3 |
| roadsegmentdata.RawColorX-N | 0, 1, 2, 3 |
| roadsegmentdata.ColorX | 0, 1, 2, 3 |
| roadsegmentdata.HealthX | 0, 1 |
| roadsegmentdata.AbnormalityX | 0, 1 |
| roadsegmentdata.PredRawColorXN | 0, 1, 2, 3 |
| roadsegmentdata.PredRawColorXNProb | Real [0, 1] |
| weather.MetarId | Integer |
| weather.MarketId | Integer |
| weather.Temperature | 32-40 F, 40-80 F, Extreme Heat, Freezing, Hot, Unknown |
| weather.WindDirection | N, NE, E, SE, S, SW, W, NW |
| weather.WindSpeed | Breezy, Calm, Windy, Heavy, Unknown |
| weather.SkyCover | Broken Clouds, Clear Skies, Few Clouds, Obscured Cover, Overcast, Scattered Clouds, Unknown |
| weather.PresentWeather | Blowing Snow, Clear or Fair, Cloudy, Fog, Haze, Mist, Rain, Snow, Thunderstorms, Unknown, Windy |
| weather.RainNHour | Extreme Rain, Hard Rain, No Rain, Soft Rain, Trace Rain, Unknown |
| schoollocation.SchoolLocationId | Integer |
| schoollocation.Name | "Lake Washington" |
| schoollocation.MarketId | Integer |
| schoolschedule.IsSchoolDay | 0, 1 |

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
receiving information describing a network of roads in a geographic area;
for each of the roads in the network, identifying multiple segments of the road for which traffic congestion will be distinctly tracked; and
automatically facilitating navigation of vehicles over the network of roads based on predicted traffic congestion of the roads, the automatic facilitating of the navigation of the vehicles being performed by one or more configured computing systems and including, for each of multiple users,
receiving a request from the user for information indicating predicted traffic conditions of roads of the network for travel to an indicated destination;
receiving information indicating current conditions that affect future traffic on the roads in the network, the current conditions including current levels of traffic on the roads, current weather for the geographic area, current events that are scheduled to occur in the geographic area, and current school sessions that are scheduled to occur in the geographic area;
identifying segments of roads of the network along one or more routes to the indicated destination from at least one possible starting position, each of the one or more routes including multiple identified road segments;
for each of multiple distinct future times, predicting an expected level of traffic congestion for each of the identified road segments at that future time, the predicting being based at least in part on the indicated current conditions;
for each of the one or more routes, determining a predicted travel time for the route based on the predicted expected traffic congestion levels for the multiple road segments of the route, the determining such that at least one predicted expected level of traffic congestion at a first future time is used for a first group of one or more of the road segments of the route and such that at least one predicted expected level of traffic congestion at a second future time is used for a second group of one or more other of the road segments of the route, the second future time being later than the first future time and the road segments of the second group being after the road segments of the first group along the route; and
providing information to the user that indicates the determined predicted travel time for at least one of the routes to the indicated destination, so that users can navigate vehicles over the network of roads based on predicted traffic congestion of the roads at multiple future times.

2. The method of claim 1 wherein, for each of at least some of the multiple users, the providing of the information to the user includes displaying to the user a map on which multiple route options are indicated in such a manner that an optimal one of the route options is identified.

3. The method of claim 1 further comprising, for each of at least some of the multiple users, after the providing of the information to the user, receiving information indicating updated current conditions, predicting an updated expected level of traffic congestion for each of at least one of the identified road segments at one or more future times based at least in part on the updated current conditions, and providing updated information to the user that indicates an updated predicted travel time for at least one route to the indicated destination based at least in part on the predicted updated expected levels of traffic congestion.

4. The method of claim 1 wherein the predicting of the expected levels of traffic congestion for identified road segments at multiple future times is based on at least one predictive model for the network of roads in the geographic area, and wherein the method further comprises automatically generating the at least one predictive models based at least in part on prior observed levels of traffic congestions for the identified road segments and on prior conditions that affected the prior observed traffic congestion levels.

5. The method of claim 1 wherein, for at least one of the multiple users, the indicated current conditions for use in predicting expected levels of traffic congestion further include current expectations for future weather for the geographic area, current traffic accidents on the roads, current construction activities on the roads, a current time of day, and a current day of week, and the current scheduled events are each associated with at least one event time and with a location in the geographic area such that traffic will be affected at one or more of the event times on segments of roads used for at least one of travel to the location and travel from the location.

6. The method of claim 1 wherein the network of roads includes roads for which traffic sensors are available to provide information about current levels of traffic, the identified segments of the roads each including at least one traffic sensor such that provided information about a current level of traffic for a road segment includes average traffic speed and/or traffic volume for that road segment.

7. A computer-implemented method comprising:
receiving indications of multiple road segments of multiple related roads;
receiving information indicating current traffic conditions at a first time for each of the road segments;
receiving information indicating other current conditions at the first time that affect traffic on the road segments, the other current conditions including multiple of current weather conditions, current events that are scheduled to occur, and current schedules for school sessions;
using the indicated current traffic conditions for the first time and the indicated other current conditions for the first time to automatically predict multiple distinct levels of traffic congestion at multiple distinct future times after the first time for each of one or more of the multiple road segments, the automatic predicting being performed by one or more configured computing systems, the predicted traffic congestion levels for the multiple future times being distinct from historical average traffic congestion levels corresponding to the multiple future times; and using at least some of the predicted traffic congestion levels to facilitate travel on the roads.

8. The method of claim 7 wherein the automatic predicting of the levels of traffic congestion is based on use of at least one predictive model that uses the indicated current traffic conditions and the indicated other current conditions as input.

9. The method of claim 8 wherein the at least one predictive model includes a Bayesian network.

10. The method of claim 8 wherein the at least one predictive model includes a probabilistic model.

11. The method of claim 8 further comprising automatically generating the predictive model based at least in part on observed past traffic congestion levels on the road segments and on past traffic conditions and past other conditions that affected the past traffic congestion levels on the road segments.

12. The method of claim 7 further comprising, after the automatic predicting of the levels of traffic congestion for one of the road segments at the multiple distinct future times, receiving updated current conditions information that is distinct from the indicated current traffic conditions and the indicated other current conditions, automatically predicting new levels of traffic congestion for the one road segment at each of at least some of the multiple distinct future times, and using one or more of the predicted new traffic congestion levels to facilitate travel on the roads.

13. The method of claim 12 wherein the using of the at least some predicted traffic congestion levels to facilitate travel on the roads includes providing information about the at least some predicted traffic congestion levels to one or more recipients for use, and wherein the using of the predicted new traffic congestion levels to facilitate travel on the roads includes providing updated information about the predicted new traffic congestion levels to at least one of the recipients.

14. The method of claim 7 wherein the indicated current traffic conditions of each of the road segments include at least one of a measured average speed on the road segment and a measured traffic volume on the multiple road segment.

15. The method of claim 14 wherein the indicated other current conditions include the current weather conditions, the current events that are scheduled to occur, the current schedules for school sessions, current expectations for future weather, current traffic accidents on the road segments, current construction activities on the road segments, a current time of day, and a current day of week.

16. The method of claim 15 wherein the automatic predicting of the multiple distinct levels of traffic congestion at the multiple distinct future times is further based on information about prior traffic conditions before the first time for the one or more road segments.

17. The method of claim 7 wherein the received information indicating the current traffic conditions is obtained at least in part from a network of multiple traffic sensors such that each of at least some of the road segments each correspond to one or more of the multiple traffic sensors.

18. The method of claim 7 wherein the received information indicating the current traffic conditions is obtained at least in part from multiple vehicles traveling the multiple related roads, each vehicle able to repeatedly determine vehicle travel data that includes at least one of location of the vehicle, speed of the vehicle, and travel direction of the vehicle, and to provide the determined vehicle travel data.

19. The method of claim 7 wherein the received information indicating the current traffic conditions is obtained at least in part from multiple users traveling the multiple related roads, each user having a mobile device operative to provide geo-location data including location of the device.

20. The method of claim 7 wherein the indicated other current conditions include one or more current weather conditions and one or more current scheduled events and one or more current school session schedules, the received information for the current weather conditions including at least one of an air temperature, a wind speed, a wind direction, an amount of precipitation measured over a period of time, and a level of sky cover, the received information for each event including at least one associated time and one or more indications of one or more locations associated with the event, and the received information for each current school session schedule including at least one associated time and one or more indications of one or more locations associated with one or more schools.

21. The method of claim 7 wherein the using of the at least some predicted traffic congestion levels to facilitate travel on the roads includes at least one of initiating presentation of the at least some predicted traffic congestion levels to a user and of providing indications of the at least some predicted traffic congestion levels to a third party that uses the provided indications to facilitate travel on the roads.

22. The method of claim 7 wherein the using of the at least some predicted traffic congestion levels for road segments to facilitate travel on the roads includes generating comparative information regarding the at least some predicted traffic congestion levels and other traffic congestion levels for those road segments, and providing one or more indications of the generated comparative information.

23. The method of claim 7 wherein the using of the at least some predicted traffic congestion levels to facilitate travel on the roads includes:
identifying multiple route options between a starting location and a destination location over the multiple roads, each of the route options including at least one of the one or more road segments;
selecting at least one of the multiple route options as being preferred based at least in part on the predicted traffic congestion levels; and
providing one or more indications of the selected route options.

24. The method of claim 23 wherein the automatic predicting of the multiple distinct levels of traffic congestion at the multiple distinct future times is performed for each of the multiple road segments, and wherein each of the identified multiple route options includes a plurality of the multiple road segments.

25. The method of claim 23 wherein the one or more road segments include a plurality of the multiple road segments, wherein one or more of the identified multiple route options each includes two or more of the plurality of road segments, and wherein the method further comprises automatically determining for each of the one or more route options a predicted travel time for the route option based on the predicted traffic congestion levels at the multiple distinct future times for the two or more road segments included in the route option, the determining of the predicted travel time for each of the one or more route options including using at least one predicted expected level of traffic congestion at one of the multiple future times for a first group of one or more of the road segments included in the route option and including using at least one predicted expected level of traffic congestion at another of the multiple future times for a second group of one or more other of the road segments included in the route option, the another future time being later than the one future time and the road segments of the second group being after the road segments of the first group along the route option.

26. The method of claim 25 wherein the selected preferred at least one route options are each one of the one or more route options, and wherein the selecting of the at least one route options as being preferred is based on the automatically determined predicted travel times for the selected preferred at least one route options.

27. The method of claim 23 wherein the using of the at least some predicted traffic congestion levels to facilitate travel on the roads includes initiating display to a user of a map on which the multiple route options are indicated.

28. The method of claim 23 wherein the using of the at least some predicted traffic congestion levels to facilitate travel on the roads includes initiating providing of the at least some predicted traffic congestion levels to a user, and wherein the method further comprises, after the providing of the at least some predicted traffic congestion levels to the user, receiving information indicating updated current conditions, predicting an updated expected level of traffic congestion for each of at least one of the one or more road segments at one or more of the multiple future times based at least in part on the updated current conditions, and providing updated information to the user that indicates an updated predicted travel time for at least one of the multiple route options based at least in part on the predicted updated expected levels of traffic congestion.

29. The method of claim 7 wherein the predicted levels of traffic congestion each have at least one associated vehicle speed, and wherein the multiple roads are part of an interconnected network of roads in a single geographic area.

30. A non-transitory computer-readable medium whose stored contents configure a computing system to perform a method, the method comprising:
receiving information indicating current traffic conditions at a first time for each of multiple road segments of one or more roads;
receiving information indicating other current conditions at the first time that affect traffic on the multiple road segments, the other current conditions including at least one of current weather conditions, current events that are scheduled to occur, and current schedules for school sessions;
using the indicated current traffic conditions for the first time and the indicated other current conditions for the first time to automatically predict multiple distinct future traffic conditions for the one or more roads, the automatic predicting being performed by the configured computing system, each of the predicted future traffic conditions being for one of the multiple road segments at one of multiple future times after the first time; and
providing one or more indications of at least some of the predicted future traffic conditions for use in facilitating travel on the one or more roads.

31. The non-transitory computer-readable medium of claim 30 wherein the predicting of the future traffic conditions for the one or more roads includes use of a predictive Bayesian network model for the one or more roads in order to predict a traffic congestion level at each of the multiple future times for each of at least one of the multiple roads.

32. The non-transitory computer-readable medium of claim 30 wherein the method further comprises identifying a route between a starting location and an ending location based at least in part on the predicted future traffic conditions, and wherein the providing of the one or more indications of the at least some predicted future traffic conditions includes indicating the identified route to a user.

33. The non-transitory computer-readable medium of claim 32 wherein the one or more roads include multiple road segments, wherein the automatic predicting of the multiple distinct future traffic conditions for the one or more roads further includes distinctly predicting future traffic conditions for each of one or more of the road segments for each of the multiple future times, and wherein the method further comprises determining multiple route options between the starting location and the destination location, each of the route options including at least one of the one or more road segments, and selecting the identified route from the multiple route options as a preferred route based at least in part on the predicted future traffic conditions.

34. The non-transitory computer-readable medium of claim 33 wherein the automatic predicting of the multiple distinct future traffic conditions for the one or more roads is further performed for each of the multiple road segments, and wherein each of the determined multiple route options includes a plurality of the multiple road segments.

35. The non-transitory computer-readable medium of claim 34 wherein the method further comprises automatically determining for each of the multiple route options a predicted travel time for the route option based on the predicted future traffic conditions at the multiple distinct future times for the plurality of road segments included in the route option, the determining of the predicted travel time for each of the route options including using at least one predicted future traffic condition at one of the multiple future times for a first group of one or more of the road segments included in the route option and including using at least one predicted future traffic condition at another of the multiple future times for a second group of one or more other of the road segments included in the route option, the another future time being later than the one future time and the road segments of the second group being after the road segments of the first group along the route option.

36. The non-transitory computer-readable medium of claim 35 wherein the selecting of the identified route as being preferred is based on the automatically determined predicted travel times for the selected identified route.

37. The non-transitory computer-readable medium of claim 32 wherein the indicating of the identified route to a user includes initiating display to the user of a map on which the identified route is indicated.

38. The non-transitory computer-readable medium of claim 32 wherein the indicating of the identified route to the user includes indicating a predicted travel time for the identified route to the user, and wherein the method further comprises, after the indicating of the identified route to the user, receiving information indicating updated current conditions, predicting updated future traffic conditions for the one or more roads at one or more of the multiple future times based at least in part on the updated current conditions, and providing updated information to the user that indicates an updated predicted travel time for the identified route based at least in part on the predicted updated future traffic conditions.

39. The non-transitory computer-readable medium of claim 30 wherein the predicted future traffic conditions for the one or more roads at the multiple future times are distinct from historical average traffic conditions corresponding to the multiple future times.

40. The non-transitory computer-readable medium of claim 30 wherein the computer-readable medium is a memory of the configured computing system, and wherein the contents are instructions that when executed program the configured computing system to perform the method.

41. The non-transitory computer-readable medium of claim 30 wherein the contents include one or more data structures for use in predicting future traffic information for roads, the one or more data structures representing a predictive Bayesian network model for the one or more roads and including multiple entries, some of the entries each corresponding to one of multiple road segments of the one or more roads and one of multiple future times so as to store a predicted future traffic condition for that road segment at that future time, and other of the entries each corresponding to one of multiple current conditions that include current traffic conditions of each of the multiple road segments and one or more other current conditions so as to store input information for the predicting.

42. A computing system, comprising:
one or more processors;
a first component configured to, when executed by at least one of the one or more processors, and for each of multiple distinct future times, predict traffic conditions at that future time for each of one or more of multiple road segments of one or more roads based at least in part on obtained information indicating current conditions related to the road segments, the indicated current conditions including multiple of current traffic conditions for the road segments, current weather conditions, current scheduled events, and current school schedules; and
a second component configured to, when executed by at least one of the one or more processors, provide one or more indications of at least one of the predicted traffic conditions for use in facilitating travel on the one or more roads.

43. The computing system of claim 42 further comprising a memory on which is stored a predictive probabilistic model for use in the predicting of the traffic conditions, the predicted traffic conditions including a predicted future traffic congestion level at each of the multiple future times for each of the multiple road segments.

44. The computing system of claim 43 wherein the second component is further configured to use the predicted traffic conditions to generate information indicating preferred travel over the one or more roads such that the provided indications include one or more indications of the generated information.

45. The computing system of claim 43 further comprising a third module configured to automatically generate the predictive model based at least in part on past traffic conditions and past conditions that affected the past traffic conditions on the road segments.

46. The computing system of claim 42 wherein the predicted future traffic conditions at the multiple future times are distinct from historical average traffic conditions corresponding to the multiple future times.

47. The computing system of claim 42 comprising a third component configured to identify a route between a starting location and an ending location based at least in part on the predicted traffic conditions for the multiple future times, and wherein the providing of the one or more indications of the at least one predicted traffic conditions includes indicating the identified route to a user.

48. The computing system of claim 45 wherein the third component is further configured to determine multiple route options between the starting location and the destination location, each of the route options including at least one of the one or more road segments, and to select the identified route from the multiple route options as a preferred route based at least in part on the predicted traffic conditions.

49. The computing system of claim 48 wherein the automatic predicting of the traffic conditions is further performed for each of the multiple road segments, and wherein each of the determined multiple route options includes a plurality of the multiple road segments.

50. The computing system of claim 49 wherein the third component is further configured to automatically determine for each of the multiple route options a predicted travel time for the route option based on the predicted traffic conditions at the multiple distinct future times for the plurality of road segments included in the route option, the determining of the predicted travel time for each of the route options including using at least one predicted future traffic condition at one of the multiple future times for a first group of one or more of the road segments included in the route option and including using at least one predicted future traffic condition at another of the multiple future times for a second group of one or more other of the road segments included in the route option, the another future time being later than the one future time and the road segments of the second group being after the road segments of the first group along the route option.

51. The computing system of claim 50 wherein the selecting of the identified route as being preferred is based on the automatically determined predicted travel times for the selected identified route.

52. The computing system of claim 47 wherein the indicating of the identified route to a user includes initiating display to the user of a map on which the identified route is indicated.

53. The computing system of claim 47 wherein the indicating of the identified route to the user includes indicating a predicted travel time for the identified route to the user, wherein the first component is further configured to, after the indicating of the identified route to the user, receive information indicating updated current conditions and predict updated future traffic conditions for the one or more road segments at one or more of the multiple future times based at least in part on the updated current conditions, and wherein the second component is further configured to provide updated information to the user that indicates an updated predicted travel time for the identified route based at least in part on the predicted updated future traffic conditions.

54. The computing system of claim 42 wherein the first component is a dynamic traffic predictor component, and wherein the first and second components each include software instructions for execution by the one or more processors.

55. The computing system of claim 42 wherein the first component consists of means for, for each of multiple distinct future times, predicting traffic conditions at that future time for each of one or more of multiple road segments of one or more roads based at least in part on obtained information indicating current conditions related to the road segments, the indicated current conditions including multiple of current traffic conditions for the road segments, current weather conditions, current scheduled events, and current school schedules, and wherein the second component consists of means for providing one or more indications of at least one of the predicted traffic conditions for use in facilitating travel on the one or more roads.

* * * * *

UNITED STATES PATENT AND TRADEMARK OFFICE
CERTIFICATE OF CORRECTION

| | | |
|---|---|---|
| PATENT NO. | : 8,065,073 B2 | |
| APPLICATION NO. | : 12/897621 | |
| DATED | : November 22, 2011 | |
| INVENTOR(S) | : Oliver B. Downs et al. | |

It is certified that error appears in the above-identified patent and that said Letters Patent is hereby corrected as shown below:

<u>Column 37, Line 59</u>:
"The computing system of claim 45 wherein the third" should read, --The computing system of claim 47 wherein the third--.

Signed and Sealed this
Thirty-first Day of July, 2012

David J. Kappos
*Director of the United States Patent and Trademark Office*